United States Patent
Lemme et al.

(10) Patent No.: US 12,059,704 B2
(45) Date of Patent: Aug. 13, 2024

(54) METHOD OF PRINTING A LAMINATE FOR PRODUCTION OF DIMENSIONALLY STABLE FOOD AND DRINK PRODUCT CONTAINERS WITH APPLICATION OF A PRIMER HAVING AN EXCESS OF ISOCYANATE GROUPS

(71) Applicant: SIG Services AG, Neuhausen am Rheinfall (CH)

(72) Inventors: Ulrich Lemme, Bedburg (DE); Andreas Lemsky, Troisdorf (DE); Dirk Schibull, Hückelhoven Baal (DE)

(73) Assignee: SIG Services AG, Neuhausen (CH)

( * ) Notice: Subject to any disclaimer, the term of this patent is extended or adjusted under 35 U.S.C. 154(b) by 291 days.

(21) Appl. No.: 16/348,759

(22) PCT Filed: Nov. 8, 2017

(86) PCT No.: PCT/EP2017/078630
§ 371 (c)(1),
(2) Date: May 9, 2019

(87) PCT Pub. No.: WO2018/087157
PCT Pub. Date: May 17, 2018

(65) Prior Publication Data
US 2019/0291386 A1    Sep. 26, 2019

(30) Foreign Application Priority Data
Nov. 10, 2016  (DE) .......................... 102016222129.9

(51) Int. Cl.
*B05D 3/04*   (2006.01)
*B05D 1/28*   (2006.01)
(Continued)

(52) U.S. Cl.
CPC ............. *B05D 3/0426* (2013.01); *B05D 1/28* (2013.01); *B05D 5/06* (2013.01); *B05D 7/52* (2013.01);
(Continued)

(58) Field of Classification Search
None
See application file for complete search history.

(56) References Cited

U.S. PATENT DOCUMENTS 5,854,306 A    12/1998  Mattesky et al.
2003/0152778 A1  8/2003  Parekh et al.
(Continued)

FOREIGN PATENT DOCUMENTS

AT        11128 U1      5/2010
DE   102009050418 A1    4/2011
(Continued)

OTHER PUBLICATIONS

Second Office Action; China National Intellectual Property Administration; Chinese Application No. 201780069334.6; Apr. 19, 2021; 13 pages.
(Continued)

*Primary Examiner* — Francisco W Tschen
(74) *Attorney, Agent, or Firm* — Taft Stettinius & Hollister LLP

(57) ABSTRACT

The present invention relates to a method comprising as method steps: a) providing a sheetlike composite precursor comprising a carrier layer; b) overlaying the sheetlike composite precursor on an outer face of the sheetlike composite precursor with a liquid first polymer composition; c) hardening the liquid first polymer composition, thereby obtaining a first polymer layer; and d) overlaying the sheetlike composite precursor on the outer face of the sheetlike composite precursor with a liquid second polymer compo-
(Continued)

Figure 1:
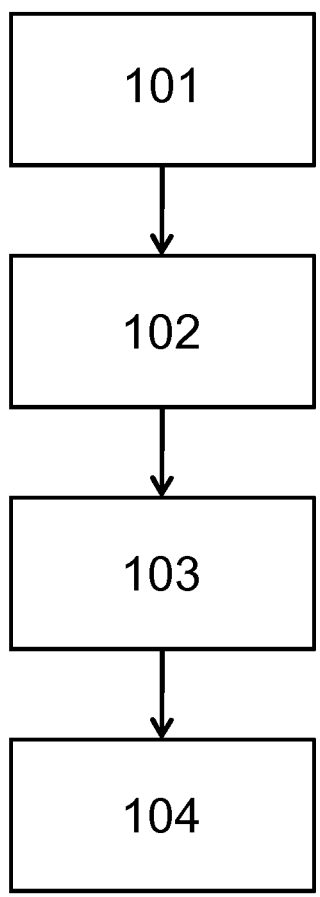

sition; wherein the first polymer layer in method step d) comprises an isocyanate content in a range from 0.1% to 50% by weight, based on the weight of the first polymer layer. The invention further relates to a sheetlike composite obtainable by the method; a container precursor and a closed container, each comprising the sheetlike composite; and to uses of a liquid primer and the sheetlike composite.

11 Claims, 8 Drawing Sheets

(51) Int. Cl.
| | | |
|---|---|---|
| B05D 5/06 | (2006.01) | |
| B05D 7/00 | (2006.01) | |
| B32B 15/20 | (2006.01) | |
| B32B 27/10 | (2006.01) | |
| B32B 27/40 | (2006.01) | |
| C09D 11/102 | (2014.01) | |
| C09D 159/00 | (2006.01) | |
| C09D 175/04 | (2006.01) | |

(52) U.S. Cl.
CPC ............. *B05D 7/546* (2013.01); *B32B 15/20* (2013.01); *B32B 27/10* (2013.01); *B32B 27/40* (2013.01); *C09D 11/102* (2013.01); *C09D 159/00* (2013.01); *C09D 175/04* (2013.01); *B05D 2201/04* (2013.01); *B05D 2503/00* (2013.01); *B32B 2255/10* (2013.01); *B32B 2255/12* (2013.01); *B32B 2255/26* (2013.01); *B32B 2307/308* (2013.01); *B32B 2307/4023* (2013.01); *B32B 2439/40* (2013.01); *B32B 2439/70* (2013.01)

(56) References Cited

U.S. PATENT DOCUMENTS

| | | | |
|---|---|---|---|
| 2005/0148686 A1 | 7/2005 | Eugene et al. | |
| 2008/0038544 A1* | 2/2008 | Kitaike | B32B 15/08 |
| | | | 428/336 |
| 2010/0279041 A1 | 11/2010 | Mathew et al. | |
| 2012/0258228 A1* | 10/2012 | Wolters | B32B 27/10 |
| | | | 426/531 |
| 2012/0261295 A1* | 10/2012 | Schibull et al. | B32B 27/34 |
| | | | 206/459.5 |
| 2012/0270682 A1* | 10/2012 | Fitchett | C08L 75/04 |
| | | | 473/378 |
| 2016/0002437 A1* | 1/2016 | Kataoka | C08G 18/6229 |
| | | | 524/871 |
| 2016/0185086 A1 | 6/2016 | Hsu et al. | |
| 2016/0257866 A1* | 9/2016 | Qu | C08G 18/289 |

FOREIGN PATENT DOCUMENTS

| | | | |
|---|---|---|---|
| DE | 102009050420 A1 | 5/2011 | |
| EP | 1229090 A1 | 8/2002 | |
| GB | 2511606 A | 9/2014 | |
| JP | 2933643 B2 | 5/1999 | |
| JP | 2001079948 A | 3/2001 | |
| JP | 2017161250 A | 9/2017 | |
| WO | 9009926 A2 | 9/1990 | |
| WO | 0222462 A1 | 3/2002 | |
| WO | 2017207363 A1 | 12/2017 | |
| WO | 2017207365 A1 | 12/2017 | |
| WO | WO-2018073183 A1 * | 4/2018 | ............. B31B 50/25 |

OTHER PUBLICATIONS

Cao, Yunlai et al.; Sealant: technology, formulation, and use; Aug. 2001; pp. 56-57; Chemical Industry Press.
Examination Report; European Patent Office; European Application No. 17808007.3; Apr. 21, 2021; 5 pages.
German Office Action, German Patent Application No. 10 2016 222 129.9, Jul. 28, 2017, 15 pages including English translation.
International Search Report and Written Opinion, PCT/EP2017/078630, Jan. 24, 2018, 8 pages.
Office Action; Japanese Patent Office; Japanese Application No. 2019-524253; Sep. 17, 2021; 6 pages.
Office Action; European Patent Office; European Application No. 17808007.3; Feb. 14, 2023; 4 pages.

* cited by examiner

100

300

400

500

600

701

801  802

702

METHOD OF PRINTING A LAMINATE FOR PRODUCTION OF DIMENSIONALLY STABLE FOOD AND DRINK PRODUCT CONTAINERS WITH APPLICATION OF A PRIMER HAVING AN EXCESS OF ISOCYANATE GROUPS

CROSS-REFERENCE TO RELATED APPLICATIONS

This application is a U.S. National Phase of International PCT Application No. PCT/EP2017/078630 filed Nov. 8, 2017, which claims the benefit of German Patent Application Serial No. 10 2016 222 129.9 filed Nov. 10, 2016, the contents of each application are incorporated herein by reference in their entirety.

The present invention relates to a method comprising as method steps
 a) providing a sheetlike composite precursor comprising a carrier layer;
 b) overlaying the sheetlike composite precursor on an outer face of the sheetlike composite precursor with a liquid first polymer composition;
 c) hardening the liquid first polymer composition, thereby obtaining a first polymer layer; and
 d) overlaying the sheetlike composite precursor on the outer face of the sheetlike composite precursor with a liquid second polymer composition;
wherein the first polymer layer in method step d) comprises an isocyanate content in a range from 0.1% to 50% by weight, based on the weight of the first polymer layer. The invention further relates to a sheetlike composite obtainable by the method; a container precursor and a closed container, each comprising the sheetlike composite; and to uses of a liquid primer and the sheetlike composite.

For some time, food and drink products, whether they be food and drink products for human consumption or else animal feed products, have been preserved by storing them either in a can or in a jar closed by a lid. In this case, the shelf life can be increased firstly by sterilizing the food or drink product and the container, here the jar or can, separately and to the greatest possible extent in each case, and then introducing the food or drink product into the container and closing the container. However, these measures for increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for this purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with the use of considerable transport volumes. Furthermore, jars and cans can be opened only with considerable expenditure of force or with the aid of tools and hence in a rather laborious manner. In the case of cans, there is a high risk of injury arising from sharp edges that occur on opening. In the case of jars, there are recurrent instances of broken glass getting into the food or drink product in the course of filling or opening of the filled jars, which in the worst case can lead to internal injuries when the food or drink product is consumed. In addition, both cans and jars have to be labelled for identification and promotion of the food or drink product contents. The jars and cans cannot readily be printed directly with information and promotional messages. In addition to the actual print, a substrate for this, a paper or suitable film, as well as a securing means, an adhesive or a sealant, is thus needed.

Other packaging systems for storing food and drink products over a long period with minimum impairment are known from the prior art. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, by contrast with film bags, can be regarded as a further development of the aforementioned jars and cans.

Here, these laminate containers already have many advantages over the conventional jars and cans. Nevertheless, there are opportunities for improvement in the case of these packaging systems too. For instance, instead of having labels adhesively attached, these containers are typically provided with printed images or colour decorations, which apart from providing information about the content of the containers are also intended to evoke important aesthetic impressions for the end user of the food and drink products located in the containers. For this purpose, in principle, one aim is a maximum quality of the printed colour decoration. It is particularly disadvantageous when these printed images suffer as a result of the usually drastic conditions during preservation by means of autoclaving. This requirement conflicts with the other requirement of the food and drink product containers for a longest possible shelf life for a wide variety of different food and drink products. The shelf life of certain food and drink products is prolonged by dispensing and treating them in what is called the "hot fill process" (cf. Ullmann's Encyclopaedia of Industrial Chemistry, Vol. A 11, "FOODS", 2., Food Technology, 1988, pages 549 and 552, VCH Verlagsgesellschaft Weinheim). To protect the colour decoration in such a process, it is customary in the prior art to use a protective coating applied over the colour layer.

In general terms, it is an object of the present invention to at least partly overcome a disadvantage that arises from the prior art. It is a further object of the invention to provide a laminate for production of dimensionally stable food and drink product containers, wherein a printed image or colour decoration of the laminate has an advantageous combination of good stability to processing of the laminate, especially to a container production, and to an autoclaving of the container produced. It is a further object of the invention for the printed image or colour decoration, in addition to the aforementioned advantages, to have maximum print quality. In this context, print quality relates especially to a maximum number of possible colour saturation levels. It is also an object of the invention to provide a method of producing the aforementioned advantageous laminate, wherein the method gives rise to less waste. In this context, there is preferably less waste of chemically reactive inks. It is a further object of the invention to provide a dimensionally stable laminate food and drink product container containing a printed image or colour decoration, wherein the container and the food or drink product situated therein have a longest possible shelf life and, at the same time, the printed image or colour decoration is as much as possible undamaged and shows the intensest possible colours. Accordingly, the printed image or colour decoration shall as far as possible not be scratched, detached or washed out. It is a further object of the invention to provide a production method for the aforementioned advantageous laminate, wherein the printed image or colour decoration is applied by intaglio printing. It is also an object of the invention to provide the aforementioned advantageous laminate and/or the aforementioned advantageous container, wherein the laminate has a very simple construction, especially a minimum number of layers. It is a further object of the invention to provide an as much as possible energy-saving production method for the aforementioned advantageous laminate. It is also a further object of the invention to provide a production method with maximum processing speed for the aforementioned advantageous laminate. It is also a further object of the invention to provide a production method for the aforementioned advantageous laminate having a minimum level of maintenance.

A contribution to the at least partial achievement of at least one, preferably more than one, of the above objects is made by the independent claims. The dependent claims provide preferred embodiments which contribute to the at least partial achievement of at least one of the objects.

A contribution to the achievement of at least one of the objects of the invention is made by an embodiment 1 of a method comprising as method steps
  a) providing a sheetlike composite precursor comprising a carrier layer;
  b) overlaying the sheetlike composite precursor on an outer face of the sheetlike composite precursor with a liquid first polymer composition;
  c) hardening the liquid first polymer composition, thereby obtaining a first polymer layer; and
  d) overlaying the sheetlike composite precursor on the outer face of the sheetlike composite precursor with a liquid second polymer composition;
wherein the first polymer layer in method step d) comprises an isocyanate content (NCO content) in a range from 0.1% to 50% by weight, preferably from 0.5% to 45% by weight, more preferably from 1% to 40% by weight, more preferably from 3% to 35% by weight, more preferably from 5% to 30% by weight, more preferably from 5% to 25% by weight, most preferably from 5% to 20% by weight, based in each case on the weight of the first polymer layer. The overlaying in method step b) or d) or in both is preferably effected by printing. A preferred printing process is one selected from the group consisting of relief printing, offset printing, flexographic printing and intaglio printing or a combination of at least two of these.

In one embodiment 2 according to the invention, the method is configured according to embodiment 1, wherein the liquid first polymer composition in method step b) is characterized by a first isocyanate content based on the weight of the liquid first polymer composition; wherein the liquid second polymer composition in method step d) is characterized by a second isocyanate content based on the weight of the liquid second polymer composition; wherein the first isocyanate content is more than the second isocyanate content. Preferably, the first isocyanate content is more than the second isocyanate content by at least 0.1% by weight, more preferably by at least 1% by weight, more preferably by at least 5% by weight, more preferably by at least 10% by weight, more preferably by at least 15% by weight, more preferably by at least 20% by weight, more preferably by at least 25% by weight, most preferably by at least 30% by weight. Also preferably, the first isocyanate content is in a range from 0.1% to 50% by weight, preferably from 0.5% to 45% by weight, more preferably from 1% to 40% by weight. Further preferably, the second isocyanate content is in a range from 0% to 10% by weight, preferably from 0% to 5% by weight, more preferably from 0% to 0.1% by weight.

In one embodiment 3 according to the invention, the method is configured according to any of the preceding embodiments, wherein the liquid first polymer composition in method step b) is characterized by
  a. a molar OH content in mol per g of the liquid first polymer composition, and
  b. a molar isocyanate content in mol per g of the liquid first polymer composition,
wherein the molar isocyanate content is more than the molar OH content. Preferably, the molar isocyanate content is more than the molar OH content by at least 1 mol/g, more preferably by at least 2 mol/g, most preferably by at least 3 mol/g. In the context of this embodiment, the aforementioned molar OH content and the molar isocyanate content each refer to the liquid first polymer composition.

In one embodiment 4 according to the invention, the method is configured according to any of the preceding embodiments, wherein the liquid second polymer composition in method step d) is characterized by
  a. a molar isocyanate content in mol per g of the liquid second polymer composition, and
  b. a molar OH content in mol per g of the liquid second polymer composition,
wherein the molar OH content is more than the molar isocyanate content. Preferably, the molar OH content is more than the molar isocyanate content by at least 0.1 mol/g, more preferably by at least 1 mol/g, most preferably by at least 2 mol/g. In the context of this embodiment, the aforementioned molar OH content and the molar isocyanate content each refer to the liquid second polymer composition.

In one embodiment 5 according to the invention, the method is configured according to any of the preceding embodiments, wherein the method further comprises a method step of
  e) overlaying the sheetlike composite precursor on the outer face of the sheetlike composite precursor with at least one liquid further polymer composition;
wherein, in method step e), the at least one, preferably each, liquid further polymer composition is characterized by a further isocyanate content, based on the weight of the liquid further polymer composition, where the first isocyanate content is more than the further isocyanate content, preferably more than each further isocyanate content. Preferably, the first isocyanate content is more than each further isocyanate content by at least 0.1% by weight, more preferably by at least 1% by weight, more preferably by at least 5% by weight, more preferably by at least 10% by weight, more preferably by at least 15% by weight, more preferably by at least 20% by weight, more preferably by at least 25% by weight, most preferably by at least 30% by weight. Also preferably, the first isocyanate content is in a range from 0.1% to 50% by weight, preferably from 0.5% to 45% by weight, more preferably from 1% to 40% by weight. Further preferably, each further isocyanate content is in a range from 0% to 10% by weight, preferably from 0% to 5% by weight, more preferably from 0% to 0.1% by weight.

In one embodiment 6 according to the invention, the method is configured according to embodiment 5, wherein the at least one, preferably each, liquid further polymer composition in method step e) is characterized by a. a molar isocyanate content in mol per g of the liquid further polymer composition, and
b. a molar OH content in mol per g of the liquid further polymer composition, wherein the molar OH content is more than the molar isocyanate content. Preferably, the molar OH content is more than the molar isocyanate content by at least 0.1 mol/g, more preferably by at least 1 mol/g, most preferably by at least 2 mol/g. In the context of this embodiment, the aforementioned molar OH content and the molar isocyanate content each refer to the liquid further polymer composition.

In one embodiment 7 according to the invention, the method is configured according to any of the preceding embodiments, wherein the liquid first polymer composition comprises a first di- or polyisocyanate.

In one embodiment 8 according to the invention, the method is configured according to embodiment 7, wherein the first di- or polyisocyanate has aromatic groups.

In one embodiment 9 according to the invention, the method is configured according to embodiment 7 or 8, wherein the first di- or polyisocyanate comprises tolylene diisocyanate. Preferably, the first di- or polyisocyanate is tolylene diisocyanate.

In one embodiment 10 according to the invention, the method is configured according to any of the preceding embodiments, wherein the liquid first polymer composition comprises a further di- or polyisocyanate.

In one embodiment 11 according to the invention, the method is configured according to embodiment 10, wherein the further di- or polyisocyanate has aliphatic groups.

In one embodiment 12 according to the invention, the method is configured according to embodiment 10 or 11, wherein the further di- or polyisocyanate comprises hexamethylene diisocyanate. Preferably, the second di- or polyisocyanate is hexamethylene diisocyanate.

In one embodiment 13 according to the invention, the method is configured according to any of the preceding embodiments, wherein the liquid first polymer composition comprises at least one di- or polyol, preferably at least 2 di- or polyols.

In one embodiment 14 according to the invention, the method is configured according to embodiment 13, wherein the at least one di- or polyol comprises and preferably consists of trimethylolpropane, or a polyester comprising OH groups, or a mixture of the two.

In one embodiment 15 according to the invention, the method is configured according to any of the preceding embodiments, wherein the liquid first polymer composition in the overlaying in method step b) further comprises a first colourant in a proportion in a range from 5% to 25% by weight, preferably from 7% to 20% by weight, more preferably from 9% to 15% by weight, based in each case on the weight of the liquid first polymer composition. A preferred first colourant is a first pigment. A preferred first pigment is $TiO_2$.

In one embodiment 16 according to the invention, the method is configured according to any of the preceding embodiments, wherein the liquid first polymer composition in the overlaying in method step b) further comprises a solvent in a range from 40% to 80% by weight, preferably from 45% to 75% by weight, more preferably from 50% to 70% by weight, more preferably from 55% to 68% by weight, most preferably from 57% to 67% by weight, based in each case on the weight of the liquid first polymer composition. A preferred solvent is a carboxylic ester, more preferably an ethyl acetate.

In one embodiment 17 according to the invention, the method is configured according to any of the preceding embodiments, wherein the liquid first polymer composition comprises at least one polymer.

In one embodiment 18 according to the invention, the method is configured according to embodiment 17, wherein the polymer is selected from the group consisting of a polyurethane, polyvinyl chloride, cellulose acetate butyrate, polyadipate and polyolefin wax or a mixture of at least two of these. A preferred polyolefin wax is a polyethylene wax or a polypropylene wax or both. Furthermore, a preferred polyolefin wax is characterized by a melting point or a dropping point or both in a range of from 85 to 165° C., preferably from 90 to 160° C., more preferably from 100 to 150° C.

In one embodiment 19 according to the invention, the method is configured according to embodiment 17 or 18, wherein the liquid first polymer composition comprises the polymer in a proportion in a range from 0.1% to 20% by weight, preferably from 0.1% to 15% by weight, more preferably from 0.2% to 10% by weight, more preferably from 0.2% to 8% by weight, more preferably from 0.2% to 6% by weight, more preferably from 0.2% to 4% by weight, most preferably from 0.4% to 2% by weight, based in each case on the weight of the liquid first polymer composition.

In one embodiment 20 according to the invention, the method is configured according to any of the preceding embodiments, wherein the liquid first polymer composition is characterized by a ratio of a proportion of aromatic groups in the liquid first polymer composition to a proportion of aliphatic groups in the liquid first polymer composition in a range from 0.30 to 0.80, preferably from 0.33 to 0.77, more preferably from 0.35 to 0.75, most preferably from 0.37 to 0.73.

In one embodiment 21 according to the invention, the method is configured according to any of the preceding embodiments, wherein the liquid second polymer composition in the overlaying in method step d) comprises a second colourant in a proportion in a range from 2% to 15% by weight, preferably from 4% to 13% by weight, more preferably from 5% to 11% by weight, most preferably from 6% to 10% by weight, based in each case on the weight of the liquid second polymer composition.

In one embodiment 22 according to the invention, the method is configured according to any of the preceding embodiments, wherein the liquid second polymer composition in the overlaying in method step d) comprises at least one first polyvinyl acetal in a proportion in a range from 2% to 12% by weight, preferably from 3.5% to 11% by weight, more preferably from 5.1% to 10% by weight, based in each case on the weight of the liquid second polymer composition.

In one embodiment 23 according to the invention, the method is configured according to any of the preceding embodiments, wherein the liquid second polymer composition in the overlaying in method step d) further comprises a second solvent in a range from 60% to 95% by weight, preferably from 64% to 91% by weight, more preferably from 69% to 88% by weight, based in each case on the weight of the liquid second polymer composition. A preferred second solvent is ethanol.

In one embodiment 24 according to the invention, the method is configured according to any of embodiments 5 to 23, wherein the at least one, preferably each, liquid further polymer composition in the overlaying in method step d) comprises a further colourant in a proportion in a range from 2% to 15% by weight, preferably from 4% to 13% by weight, more preferably from 5% to 11% by weight, most preferably from 6% to 10% by weight, based in each case on the weight of the respective liquid further polymer composition.

In one embodiment 25 according to the invention, the method is configured according to any of embodiments 5 to 24, wherein the at least one, preferably each, liquid further polymer composition in the overlaying in method step e) comprises at least one further polyvinyl acetal in a proportion in a range from 2% to 12% by weight, preferably from 3.5% to 11% by weight, more preferably from 5.1% to 10% by weight, based in each case on the weight of the respective liquid further polymer composition.

In one embodiment 26 according to the invention, the method is configured according to any of embodiments 5 to 25, wherein the at least one, preferably each, liquid further polymer composition in the overlaying in method step e) further comprises a further solvent in a range from 60% to 95% by weight, preferably from 64% to 91% by weight, more preferably from 69% to 88% by weight, based in each case on the weight of the respective liquid further polymer composition. A preferred further solvent is ethanol.

In one embodiment 27 according to the invention, the method is configured according to any of the preceding embodiments, wherein the sheetlike composite precursor in method step a) further comprises a barrier layer, wherein the barrier layer overlies the carrier layer on a side of the carrier layer remote from the outer face of the sheetlike composite precursor.

In one embodiment 28 according to the invention, the method is configured according to embodiment 27, wherein the sheetlike composite precursor comprises a polymer interlayer between the carrier layer and the barrier layer.

In one embodiment 29 according to the invention, the method is configured according to any of embodiments 1 to 26, wherein the method further comprises a method step of
f) overlaying the carrier layer with a barrier layer on a side of the carrier layer remote from the outer face of the sheetlike composite precursor.

In one embodiment 30 according to the invention, the method is configured according to embodiment 29, wherein a polymer interlayer is also introduced between the carrier layer and the barrier layer in method step f).

In one embodiment 31 according to the invention, the method is configured according to any of the preceding embodiments, wherein the sheetlike composite precursor in method step a) further comprises an outer polymer layer, wherein the outer polymer layer overlies the carrier layer on a side of the carrier layer facing the outer face of the sheetlike composite precursor. Preferably, the outer polymer layer comprises the outer face of the sheetlike composite precursor.

In one embodiment 32 according to the invention, the method is configured according to any of the preceding embodiments, wherein the hardening in method step c) is effected at a temperature of the liquid first polymer composition and/or the first polymer layer in a range from 10 to 45° C., preferably from 15 to 40° C., more preferably from 15 to 35° C., most preferably from 18 to 30° C.

In one embodiment 33 according to the invention, the method is configured according to any of the preceding embodiments, wherein the overlaying in method step b) is effected by an application to an outer surface of the sheetlike composite precursor, wherein, prior to method step b), a surface tension of the outer surface is altered, preferably increased, by means of a surface treatment to a value in a range from 36 to 44 dyn/cm, preferably from 38 to 44 dyn/cm, more preferably from 40 to 42 dyn/cm. A preferred surface treatment is one selected from the group consisting of a flame treatment, a fluorination, a plasma treatment and a corona treatment or a combination of at least two of these. If a surface tension is too low, the first polymer layer detaches too readily, whereas there are organoleptic disadvantages if a surface tension is too high, especially when the sheetlike composites obtained are stored for relatively long periods as rolls or stacks.

In general, the corona treatment is an electrochemical process for treating surfaces, preferably polymer surfaces. Preferably, the outer surface of the sheetlike composite precursor is exposed to an electrical high-voltage discharge during the corona treatment. The electrical high-voltage discharge is preferably generated between a first and a further electrode. The first electrode is preferably a roll, preferably a metal roll, preferably having a polished roll surface. A preferred roll surface consists of steel or aluminium or both. Further preferably, the first electrode is earthed and the further electrode not. Alternatively, the further electrode can be earthed and the first electrode not. During the corona treatment, the outer surface is preferably facing at least in part the first electrode. Yet more preferably, during the corona treatment, the outer surface is in physical contact with the first electrode. The unearthed electrode is preferably connected in an electrically conducting manner to a high-frequency generator which is preferably designed to generate an alternating voltage in a range of from 10 to 20 kV, preferably having a frequency in a range of from 10 to 60 kHz.

In one embodiment 34 according to the invention, the method is configured according to embodiment 33, wherein the surface treatment is a corona treatment, wherein the corona treatment is characterized by a parameter A in a range from 3 to 20 W·min/m, preferably from 3 to 18 W·min/m, more preferably from 4 to 16 W·min/m, wherein the parameter A is a quotient of an input power of the corona treatment in W and a speed of a movement of the sheetlike composite precursor during the corona treatment in m/min. Here, the movement is preferably a translation. More preferably, the corona treatment is effected with an input power in a range from 2000 to 4800 W, more preferably from 2500 W to 4800 W, most preferably from 3000 to 4500 W. Preferably, the sheetlike composite precursor here is moved at a speed in a range from 200 to 1000 m/min, more preferably from 250 to 700 m/min, most preferably from 300 to 600 m/min.

In one embodiment 35 according to the invention, the method is configured according to any of the preceding embodiments, wherein the overlaying in method step b) is effected by contacting the sheetlike composite precursor with a first printing form surface of a first printing form. The overlaying in method step b) is preferably effected by printing. A preferred printing process is one selected from the group consisting of relief printing, offset printing, flexographic printing and intaglio printing or a combination of at least two of these.

In one embodiment 36 according to the invention, the method is configured according to embodiment 35, wherein the first printing form surface comprises a first multitude of recesses, wherein the recesses of the first multitude of recesses for the overlaying in method step b) comprise at least some of the liquid first polymer composition.

In one embodiment 37 according to the invention, the method is configured according to embodiment 36, wherein the recesses of the first multitude of recesses each have a holding volume in a range from 5 to 15 ml per m$^2$, preferably from 6 to 13 ml per m$^2$, more preferably from 7 to 12 ml per m², most preferably from 8 to 11 ml per m², of the first printing form surface in each case.

In one embodiment 38 according to the invention, the method is configured according to embodiment 36 or 37, wherein the recesses of the first multitude of recesses are arranged on the first printing form surface in a first pattern, wherein the first pattern has a first number of grid lines per cm on a straight line perpendicular to the grid lines on the first printing form surface in a range of from 50 to 85, preferably from 55 to 80, more preferably from 60 to 75.

In one embodiment 39 according to the invention, the method is configured according to any of the preceding embodiments, wherein the sheetlike composite precursor during the overlaying in a method step selected from the group consisting of method step b), method step d) and method step e) or a combination of at least two of these is moved at a speed in a range from 200 to 1000 m/min, preferably from 250 to 700 m/min, more preferably from 300 to 600 m/min.

In one embodiment 40 according to the invention, the method is configured according to any of the preceding embodiments, wherein the overlaying in method step d) is effected by contacting the sheetlike composite precursor with a second printing form surface of a second printing form. Preferably, the overlaying in method step e) is effected by contacting the sheetlike composite precursor with at least one further printing form surface of at least one further printing form. The overlaying in method step d) or e) or in both is preferably effected by printing. A preferred printing process is one selected from the group consisting of relief printing, offset printing, flexographic printing and intaglio printing or a combination of at least two of these.

In one embodiment 41 according to the invention, the method is configured according to embodiment 40, wherein the second printing form surface comprises a second multitude of recesses, wherein the recesses of the second multitude of recesses for the overlaying in method step d) comprise at least some of the liquid second polymer composition. Preferably, every further printing form surface comprises a further multitude of recesses in each case, wherein the recesses of every further multitude of recesses for the overlaying in method step e) comprise the respective liquid further polymer composition.

In one embodiment 42 according to the invention, the method is configured according to embodiment 41, wherein the recesses of the first multitude of recesses each have a first holding volume, wherein the recesses of the second multitude of recesses each have a second holding volume, wherein the first holding volume is less than the second holding volume. Preferably, the first holding volume is less than the second holding volume by at least 0.5 ml per m², more preferably by at least 1 ml per m². Preferably, the second holding volume is in a range from 6 to 16 ml per m², preferably from 7 to 14 ml per m², more preferably from 8 to 13 ml per m², most preferably from 9 to 12 ml per m², of the second printing form surface in each case. Preferably, the recesses of the first multitude of recesses each have a first holding volume, wherein the recesses of each further multitude of recesses each have a further holding volume, wherein the first holding volume is less than the further holding volumes. Preferably, the first holding volume is less than every further holding volume by at least 0.5 ml per m², more preferably by at least 1 ml per m². Preferably, every further holding volume is in a range of from 6 to 16 ml per m², preferably from 7 to 14 ml per m², more preferably from 8 to 13 ml per m², most preferably from 9 to 12 ml per m², of the respective further printing form surface in each case.

In one embodiment 43 according to the invention, the method is configured according to embodiment 41 or 42, wherein the recesses of the first multitude of recesses are arranged on the first printing form surface in a first pattern, wherein the first pattern has a first number of grid lines per cm on a straight line perpendicular to the grid lines on the first printing form surface, wherein the recesses of the second multitude of recesses are arranged on the second printing form surface in a second pattern, wherein the second pattern has a second number of grid lines per cm on a straight line perpendicular to the grid lines on the second printing form surface, wherein the first number is greater than the second number. Preferably, the second number is in a range of from 45 to 65 grid lines per cm, more preferably from 50 to 65 grid lines per cm, most preferably from 55 to 65 grid lines per cm, in each case on a straight line perpendicular to the grid lines on the second printing form surface. Preferably, the recesses of the first multitude of recesses are arranged on the first printing form surface in a first pattern, wherein the first pattern has a first number of grid lines per cm on a straight line perpendicular to the grid lines on the first printing form surface, wherein the recesses of each further multitude of recesses are arranged on the respective further printing form surface in a respective further pattern, wherein each further pattern has a respective further number of grid lines per cm on a straight line perpendicular to the grid lines on the respective further printing form surface, wherein the first number is greater than each further number. Preferably, each further number is in a range of from 45 to 65 grid lines per cm, more preferably from 50 to 65 grid lines per cm, most preferably from 55 to 65 grid lines per cm, in each case on a straight line perpendicular to the grid lines on the respective further printing form surface.

In one embodiment 44 according to the invention, the method is configured according to any of the preceding embodiments, wherein the sheetlike composite precursor is overlaid in method step b) with the liquid first polymer composition at least partly up to a first maximum area coverage, wherein the sheetlike composite precursor is overlaid in method step d) with the liquid second polymer composition at least partly up to a second maximum area coverage, wherein the first maximum area coverage is more than the second maximum area coverage. Preferably, the first maximum area coverage is greater than the second maximum area coverage by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. Preferably, the sheetlike composite precursor is overlaid in method step e) with at least one liquid further polymer composition, preferably with at least 2 liquid further polymer compositions, more preferably with at least 3 liquid further polymer compositions, more preferably with at least 4 liquid further polymer compositions, more preferably with at least 5 liquid further polymer compositions, most preferably with at least 6 liquid further polymer compositions, at least partly to an extent of a further maximum area coverage in each case which is less than the first maximum area coverage. Preferably, the first maximum area coverage is more than the aforementioned further maximum area coverages by at least 1%, more preferably by at least 2%, more preferably by at least 3%, more preferably by at least 4%, more preferably by at least 5%, more preferably by at least 10%, more preferably by at least 15%, more preferably by at least 20%, more preferably by at least 25%, most preferably by at least 30%. The area coverages mentioned herein are preferably based on an area of the outer face of the sheetlike composite precursor.

In one embodiment 45 according to the invention, the method is configured according to any of the preceding embodiments, wherein the sheetlike composite precursor is overlaid with the liquid first polymer composition in method step b) to an extent of a first maximum area coverage in a range from 65% to 100%, preferably from 70% to 100%, more preferably from 75% to 100%, more preferably from 80% to 100%, more preferably from 85% to 100%, more preferably from 90% to 100%, most preferably from 95% to 100%.

In one embodiment 46 according to the invention, the method is configured according to any of the preceding embodiments, wherein the sheetlike composite precursor is overlaid with the liquid second polymer composition in method step d) to an extent of a second maximum area coverage in a range from 0.1% to 95%, preferably from 1% to 95%, more preferably from 5% to 95%, more preferably from 10% to 95%, more preferably from 10% to 90%, more preferably from 10% to 85%, more preferably from 10% to 80%, more preferably from 10% to 75%, most preferably from 15% to 75%.

In one embodiment 47 according to the invention, the method is configured according to any of the preceding embodiments, wherein the first polymer layer is not overlaid on a side of the first polymer layer remote from the carrier layer with any layer of the sheetlike composite over more than 90%, preferably more than 85%, more preferably more than 80%, most preferably more than 76%, of a surface of the first polymer layer in each case.

In one embodiment 48 according to the invention, the method is configured according to any of embodiments 27 to 47, wherein the method further comprises a method step I., wherein, in method step I., the barrier layer is overlaid with an inner polymer composition on a side of the barrier layer remote from the carrier layer. Preferably, the inner polymer composition comprises a polymer produced by means of a metallocene catalyst to an extent of 10% to 90% by weight, preferably to an extent of 25% to 90% by weight, more preferably to an extent of 30% to 80% by weight, based in each case on the total weight of the inner polymer composition. In a further preferred embodiment, the inner polymer composition comprises a polymer blend, wherein the polymer blend comprises an mPE to an extent of 10% to 90% by weight, preferably to an extent of 25% to 90% by weight, more preferably to an extent of 30% to 80% by weight, and a further polymer to an extent of at least 10% by weight, preferably to an extent of at least 15% by weight, more preferably to an extent of at least 20% by weight, based in each case on the total weight of the polymer blend. The overlaying with the inner polymer composition can be effected before, after, simultaneously with or overlapping in time with one of method steps b), c) and/or d). Preferably, the overlaying with the inner polymer composition precedes method step b).

In one embodiment 49 according to the invention, the method is configured according to any of embodiments 27 to 48, wherein the carrier layer in method step a) has at least one hole, wherein the hole has been covered at least by the barrier layer.

In one embodiment 50 according to the invention, the method is configured according to any of the preceding embodiments, wherein a perforation is introduced into the carrier layer after method step d). Preferably, the perforation is introduced by means of electromagnetic waves, preferably by means of a laser beam. In a further preferred embodiment, the perforation is introduced by contacting with a perforation tool, preferably a punching tool.

In one embodiment 51 according to the invention, the method is configured according to any of the preceding embodiments, wherein the carrier layer comprises one selected from the group consisting of cardboard, paperboard and paper, or a combination of at least two of these.

In one embodiment 52 according to the invention, the method is configured according to any of its embodiments 1 to 51, wherein, in method step b), 65% to 100%, preferably 70% to 100%, more preferably 75% to 95%, more preferably 80% to 95%, most preferably 80% to 88%, of the outer face of the sheetlike composite precursor is overlaid with the liquid first polymer composition.

A contribution to the achievement of at least one of the objects of the invention is made by an embodiment 1 of a sheetlike composite, obtainable by the method according to the invention according to any of its embodiments 1 to 52.

In one embodiment 2 according to the invention, the sheetlike composite is configured according to its embodiment 1, wherein the sheetlike composite comprises, in the form of layers of a layer sequence, in the direction from an outer face of the sheetlike composite to an inner face of the sheetlike composite, a. a second polymer layer,
b. the first polymer layer, and
c. the carrier layer, wherein the first polymer layer comprises a crosslinked first polymer, wherein the second polymer layer comprises a crosslinked second polymer. A preferred crosslinked first polymer is a polyaddition product. Further, a preferred crosslinked second polymer is a polyaddition product. In this case, the crosslinked first polymer and the crosslinked second polymer may be the same or different.

In one embodiment 3 according to the invention, the sheetlike composite is configured according to its embodiment 1 or 2, wherein the first polymer layer is characterized by a ratio of a proportion of aromatic groups in the first polymer layer to a proportion of aliphatic groups in the first polymer layer in a range from 0.30 to 0.80, preferably from 0.33 to 0.77, more preferably from 0.35 to 0.75, most preferably from 0.37 to 0.73.

In one embodiment 4 according to the invention, the sheetlike composite is configured according to any of its embodiments 1 to 3, wherein the first polymer layer has an L* value in the L*a*b* colour system of at least 80, preferably of at least 82, more preferably of at least 85, most preferably of at least 87.

In one embodiment 5 according to the invention, the sheetlike composite is configured according to any of its embodiments 1 to 4, wherein the first crosslinked polymer is a first polyurethane.

In one embodiment 6 according to the invention, the sheetlike composite is configured according to any of its embodiments 1 to 5, wherein the second crosslinked polymer is a second polyurethane.

In one embodiment 7 according to the invention, the sheetlike composite is configured according to any of its embodiments 1 to 6, wherein the first polymer layer comprises an additional polymer other than the first crosslinked polymer.

In an embodiment 8 according to the invention, the sheetlike composite is configured according to its embodiment 7, wherein the additional polymer is selected from the group consisting of polyvinyl chloride, cellulose acetate butyrate, polyadipate and polyolefin wax or a mixture of at least two of these. A preferred polyolefin wax is a polyethylene wax or a polypropylene wax or both. Furthermore, a preferred polyolefin wax is characterized by a dropping point or a melting point or both in a range of from 90 to 160° C., preferably from 100 to 150° C. in each case. A further preferred polyolefin wax is a polyethylene wax or a polypropylene wax or both.

In one embodiment 9 according to the invention, the sheetlike composite is configured according to any of its embodiments 1 to 8, wherein the carrier layer comprises one selected from the group consisting of cardboard, paperboard, and paper, or a combination of at least two of these.

In one embodiment 10 according to the invention, the sheetlike composite is configured according to any of its embodiments 1 to 9, wherein the sheetlike composite further comprises at least one further polymer layer, wherein every further polymer layer overlays the first polymer layer on a side of the first polymer layer remote from the carrier layer, wherein every further polymer layer comprises a further crosslinked polymer in each case. A preferred crosslinked further polymer is a polyaddition product. It is possible here for the crosslinked further polymers each to be the same as or different from the crosslinked first polymer and the crosslinked second polymer. A polyaddition product particularly preferred as a further crosslinked polymer is a further polyurethane.

A contribution to the achievement of at least one of the objects of the invention is made by an embodiment 1 of a container precursor comprising the sheetlike composite according to any of its embodiments 1 to 10.

In one embodiment 2 according to the invention, the container precursor is configured according to its embodiment 1, wherein the sheetlike composite comprises at least 3, preferably at least 4, folds.

In one embodiment 3 according to the invention, the container precursor is configured according to its embodiment 1 or 2, wherein the sheetlike composite comprises a first longitudinal rim and a further longitudinal rim, wherein the first longitudinal rim is joined to the further longitudinal rim, thereby forming a longitudinal seam of the container precursor.

In one embodiment 4 according to the invention, the container precursor is configured according to any of its embodiments 1 to 3, wherein the container precursor at least partly surrounds an interior, wherein an outer surface of the container precursor remote from the interior comprises a surface of the first polymer layer or a surface of the second polymer layer or both.

A contribution to the achievement of at least one of the objects of the invention is made by an embodiment 1 of a closed container comprising the sheetlike composite according to any of its embodiments 1 to 10.

In one embodiment 2 according to the invention, the closed container is configured according to its embodiment 1, wherein the sheetlike composite comprises a first longitudinal rim and a further longitudinal rim, wherein the first longitudinal rim is joined to the further longitudinal rim, thereby forming a longitudinal seam of the closed container.

In one embodiment 3 according to the invention, the closed container is configured according to either of its embodiments 1 and 2, wherein the closed container comprises a food or drink product.

In one embodiment 4 according to the invention, the closed container is configured according to any of its embodiments 1 to 3, wherein the sheetlike composite comprises at least 3, preferably at least 4, more preferably at least 12, folds.

In one embodiment 5 according to the invention, the closed container is configured according to any of its embodiments 1 to 4, wherein the closed container at least partly surrounds an interior, wherein an outer surface of the container precursor remote from the interior comprises a surface of the first polymer layer or a surface of the second polymer layer or both.

A contribution to the achievement of at least one of the objects of the invention is made by an embodiment 1 of a use 1 of a liquid primer for printing of a sheetlike composite precursor, comprising a carrier layer; wherein the liquid primer is characterized by
  a. a molar OH content in mol per g of the liquid primer, and
  b. a molar isocyanate content in mol per g of the liquid primer,
wherein the molar isocyanate content is more than the molar OH content. Preferably, the molar isocyanate content is more than the molar OH content by at least 1 mol/g, more preferably by at least 2 mol/g, most preferably by at least 3 mol/g. In the context of this embodiment, the aforementioned molar OH content and the molar isocyanate content each refer to the liquid primer. A preferred liquid primer is constituted like the first polymer composition according to one embodiment of the method of the invention.

In one embodiment 2 of the invention, the use 1 is configured according to its embodiment 1, wherein a primer layer is obtained from the primer, wherein the primer layer is printed with a printing ink, wherein the printing ink is characterized by
  a. a molar isocyanate content in mol per g of the printing ink, and
  b. a molar OH content in mol per g of the printing ink,
wherein the molar OH content is more than the molar isocyanate content. Preferably, the molar OH content is more than the molar isocyanate content by at least 0.1 mol/g, more preferably by at least 1 mol/g, most preferably by at least 2 mol/g. In the context of this embodiment, the aforementioned molar OH content and the molar isocyanate content each refer to the printing ink.

A contribution to the achievement of at least one of the objects of the invention is made by an embodiment 1 of a use 2 of the sheetlike composite according to the invention according to one of its embodiments 1 to 10 for production of a food or drink product container.

Features described as preferred in one category of the invention are likewise preferred in an embodiment of the further categories of the invention.

Di- or Polyol

Useful di- or polyols include all di- or polyols that are known to the person skilled in the art for polyurethane formation and seem suitable for the process according to the invention. These are, for example, sugars such as isomalt, sorbitol or mannitol, aliphatic alcohols such as ethane-1,2-diol, propane-1,3-diol, propane-1,2,3-triol, pentaerythritol, polyester polyols or polyether polyols, especially polyethylene oxide (EO) or polypropylene oxide (PO), or at least two of these, particular preference being given to polyester polyols or polyether polyols or the combination thereof and further preference to polyether polyols.

Di- or Polyisocyanate

Useful di- or polyisocyanates include all of those that are known to the person skilled in the art for polyurethane formation and seem suitable for the process according to the invention. These are, for example, diphenylmethane diisocyanate (MDI), polymeric diphenylmethane diisocyanate (PMDI), tolylene diisocyanate (TDI), naphthylene diisocyanate (NDI), hexamethylene diisocyanate (HDI), isophorone diisocyanate (IPDI) or 4,4'-iisocyanatodicyclohexylmethane (H12MDI) or at least two of these.

Polyaddition Product

For the crosslinked first, crosslinked second and crosslinked further polymers, useful polyaddition products are all of those that are known to the person skilled in the art and seem suitable for the process according to the invention. By contrast with the chain polymers, the monomers of the polyaddition products are capable of reacting with one another to form di-, tri- or oligomers without requiring an initiator which, as in the case of free-radical polymerization, initiates a reaction of a monomer that then reacts successively with other monomers. The di-, tri- or oligomers that form at the start of the polyaddition are additionally capable of reacting with one another to form larger units. Typical polyaddition products are polyamides, polycarbonates, polyesters, polyphenylene oxides, polysulfones, polyepoxides or polyurethanes or a combination of at least two of these, particular preference being given to polyaddition products consisting of polyurethane to an extent of at least 50% by weight, preferably at least 70% by weight and more preferably at least 90% by weight, based in each case on the polyaddition product. It is further preferable that one layer selected from the group consisting of the first polymer layer, the second polymer layer and the further polymer layers or a combination of at least two of the above consist(s) of a polyaddition product to an extent of at least 50% by weight, preferably at least 70% by weight and more preferably at least 90% by weight, based in each case on the respective polymer layer. In general, the aforementioned polymer layers, however, do not comprise more than 99% by weight of the polyaddition product, in order still to be able to contain other substances such as colourants.

Solvents

Solvents are considered to be substances having a melting point of less than 10° C. In principle, useful solvents are all of those known to the person skilled in the art that are suitable for the process according to the invention. For the first polymer composition in particular, polar solvents are preferred. Among these, aprotic and protic solvents are suitable. Among these, preference is given to aprotic polar solvents for the first polymer composition, among which particular preference is given to esters and ketones, for example acetone. Useful esters include, in particular, ethyl acetate, n-propyl acetate or methoxypropyl acetate. For the second and further polymer compositions, ethanol is a particularly preferred solvent.

Polymer Compositions

In the process according to the invention, it is preferable that a polymer composition selected from the group consisting of the liquid first polymer composition, the liquid second polymer composition and the liquid further polymer compositions or a combination of at least two of these, in the respective overlaying of the outer face of the sheetlike composite precursor with the respective liquid polymer composition, has a temperature in the range from 25 to 40° C., preferably in the range from 26 to 32° C. and more preferably in the range from 27 to 29° C. This has an advantageous effect on the autoclaving resistance of the polymer layer produced.

In addition, in the process according to the invention, it is preferable that a polymer composition selected from the group consisting of the liquid first polymer composition, the liquid second polymer composition and the liquid further polymer compositions or a combination of at least two of these, in the respective overlaying of the outer face of the sheetlike composite precursor with the respective liquid polymer composition, has a viscosity in the range from 0.05 to 0.3 Pa·s and preferably in the range from 0.1 to 0.2 Pa·s. The viscosity is determined according to DIN 53019-1 by means of a rotary viscometer. The application of liquid polymer compositions with such viscosities leads to homogeneous polymer layers. This has an advantageous effect on the autoclaving resistance of the polymer layers.

Further, the liquid first polymer composition, the liquid second polymer composition and/or the further liquid polymer compositions may comprise additives. Suitable additives are all of those that are known to the person skilled in the art and are suitable for the process according to the invention. Preference is given to using waxes, soaps or surfactants and, for increasing the storability of the polymer composition, stabilizers. Frequently, the additives have a melting point above 30° C. and preferably above 50° C. The additives can adjust the viscosity and surface tension of the liquid polymer compositions.

The respective overlaying of the outside of the sheetlike composite precursor with the liquid first, second and further polymer compositions can be effected, for example, by any suitable printing process known to those skilled in the art. Printing methods especially include planographic printing, digital printing, relief printing and intaglio printing, preferably intaglio printing. In the process according to the invention, it is preferable that the respective liquid polymer composition is applied to the sheetlike composite precursor by means of a printing form surface having a multitude of recesses that take up at least some of the respective liquid polymer composition and preferably take the form of wells. The printing form surface is preferably on a roll that draws the liquid polymer composition from a reservoir vessel. It is further preferable that very substantially homogeneous filling of the recesses is ensured by means of a homogenizer, preferably in the form of a squeegee. The resultant improvement in the uniformity of the polymer layer produced has a positive effect on autoclaving resistance. Moreover, it is preferable in the method according to the invention that the outer face of the sheetlike composite precursor is pressed onto the printing form surface by means of a pressing means, preferably a press roll, also called impression roll.

First, Second and Further Polymer Layers

The area coverages of the first, second and further polymer layers may be less than 100%. Accordingly, these layers may take the form of noncontinuous layers. More preferably, the area coverage of the first polymer layer is 100%. In this case, the first polymer layer is a fully covering and hence continuous layer. Layers that overlay such a first polymer layer toward the outer face of the sheetlike composite lie atop the first polymer layer which preferably serves as primer. The second and further polymer layers preferably have area coverages of less than 100%. In this case, the layers are non-covering. Instead, they have clear regions, which means that these layers are noncontinuous. Thus, these layers need not lie atop one another. Instead, these layers may each consist of a multitude of regions unconnected to one another. Thus, the regions of the further polymer layers may be arranged alongside and/or partly atop the regions of the second polymer layer. Such an arrangement is especially the result of application of the second polymer composition from which the second polymer layer is preferably obtained and of the further polymer compositions from which the further polymer layers are each preferably obtained by means of intaglio printing with area coverages of less than 100%. If there is a plurality of noncontinuous layers not lying one on top of another, but instead, as described above, lying in a plane of the layer sequence, the layers can preferably be easily distinguished from one another in that they comprise different colourants, preferably different colours.

Polyvinyl Acetal

Polyvinyl acetals are thermoplastics which are prepared by reaction of polyvinyl alcohol with aldehydes or ketones. According to the aldehyde used, for example formaldehyde, acetaldehyde or butyraldehyde, a distinction is made between various polyvinyl acetals. Preferred polyvinyl acetals are polyvinyl formal and polyvinyl butyral. A particularly preferred polyvinyl acetal is polyvinyl butyral (PVB).

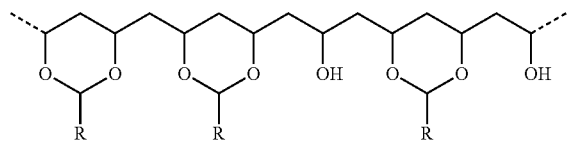

Polyvinyl format (R = H)
Polyvinyl butyral (R = n-C$_3$H$_7$)

Autoclaving

Autoclaving refers to a treatment of a product, usually of a filled and closed container, wherein the product is within a pressure chamber and is heated to a temperature above 100° C., preferably between 100 and 140° C. In addition, the chamber pressure in the pressure chamber is above 1 bar, preferably above 1.1 bar, more preferably above 1.2 bar, more preferably above 1.3 bar, and up to 4 bar. Further preferably, the autoclaving is effected under contact of the product with water vapour.

Colourant

Useful colourants include both solid and liquid colourants that are known to the person skilled in the art and are suitable for the present invention. According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). A pigment is a colourant that is preferably insoluble in the application medium. A dye is a colourant that is preferably soluble in the application medium. A preferred first colourant is a first pigment. A preferred first pigment is TiO$_2$. The second colourant and the further colourants are preferably each colourants of a chromatic colour. The first colourant is preferably a white colourant. Preferably, the chromatic colours are at least partly selected from the group consisting of red, green and blue. In another preferred embodiment, the chromatic colours are at least partly selected from the group consisting of cyan, magenta and yellow. Pigments that are suitable as a second and/or further colourant also include the following:

i. Red or magenta pigments:
Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257;
Pigment Violet 3, 19, 23, 29, 30, 37, 50 and 88;

ii. Blue or cyan pigments:
Pigment Blue 1, 15, 15:1, 15:2, 15:3, 15:4, 15:6, 16, 17-1, 22, 27, 28, 29, 36 and 60;

iii. Green pigments:
Pigment Green 7, 26, 36 and 50;

iv. Yellow pigments:
Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185 and 193.

In addition, pigments suitable as first colourant include the following white pigments: Pigment White 6, 18 and 21.

Layers of the Sheetlike Composite

The layers of the layer sequence are joined to one another. Two layers are joined to one another when their adhesion to one another extends beyond van der Waals attraction forces. Layers that have been joined to one another preferably belong to a category selected from the group consisting of sealed to one another, adhesively bonded to one another and compressed to one another, or a combination of at least two of these. Unless stated otherwise, in a layer sequence, the layers may follow one another indirectly, i.e. with one or at least two intermediate layers, or directly, i.e. with no intermediate layer. This is the case especially with the form of words in which one layer overlays another layer or a layer or surface is overlaid with a composition or a further layer. A form of words in which a layer sequence comprises enumerated layers means that at least the layers specified are present in the sequence specified. This form of words does not necessarily mean that these layers follow on directly from one another. A form of words in which two layers adjoin one another means that these two layers follow on from one another directly and hence with no intermediate layer. However, this form of words does not specify whether or not the two layers are joined to one another. Instead, these two layers may be in contact with one another.

Polymer Layers

The term "polymer layer" refers hereinafter to the inner polymer layer, the intermediate polymer layer and the outer polymer layer. A preferred polymer is a polyolefin. Said polymer layers may have further constituents. These polymer layers are preferably introduced into or applied to the sheetlike composite material in an extrusion process. The further constituents of in the polymer layers are preferably constituents that do not adversely affect the behaviour of the polymer melt on application as a layer. The further constituents may, for example, be inorganic compounds, such as metal salts, or further plastics, such as further thermoplastics. However, it is also conceivable that the further constituents are fillers or pigments, for example carbon black or metal oxides. Suitable thermoplastics for the further constituents especially include those that are readily processible by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene) and VLDPE (very low density polyethylene) and mixtures of at least two thereof. It is also possible to use mixtures of at least two thermoplastics.

Suitable polymer layers have a melt flow rate (MFR) in a range from 1 to 25 g/10 min, preferably in a range from 2 to 20 g/10 min and more preferably in a range from 2.5 to 15 g/10 min, and a density in a range from 0.890 g/cm³ to 0.980 g/cm³, preferably in a range from 0.895 g/cm³ to 0.975 g/cm³, and further preferably in a range from 0.900 g/cm³ to 0.970 g/cm³. The polymer layers preferably have at least one melting temperature in a range from 80 to 155° C., preferably in a range from 90 to 145° C. and more preferably in a range from 95 to 135° C.

Inner Polymer Layer

The inner polymer layer is based on thermoplastic polymers, where the inner polymer layer may include a particulate inorganic solid. However, it is preferable that the inner polymer layer comprises a thermoplastic polymer to an extent of at least 70% by weight, preferably at least 80% by weight and more preferably at least 95% by weight, based in each case on the total weight of the inner polymer layer. Preferably, the polymer or polymer mixture of the inner polymer layer has a density (to ISO 1183-1:2004) in a range from 0.900 to 0.980 g/cm³, more preferably in a range from 0.900 to 0.960 g/cm³ and most preferably in a range from 0.900 to 0.940 g/cm³. The polymer is preferably a polyolefin, mPolymer or a combination of the two.

Outer Polymer Layer

The outer polymer layer preferably comprises a polyethylene or a polypropylene or both. Particular preference is given here to polypropylene. Preferred polyethylenes are LDPE and HDPE and mixtures of these. A preferred further polymer layer comprises an LDPE to an extent of at least 50% by weight, preferably to an extent of at least 60% by weight, more preferably to an extent of at least 70% by weight, still more preferably to an extent of at least 80% by weight, most preferably to an extent of at least 90% by weight, based in each case on the weight of the further polymer layer.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. Dimensionally stable containers of this kind should in principle be distinguished from pouches and bags, which are usually produced from thin films. As well as a number of plastics, preference is given to plant-based fibrous materials, especially pulps, preferably limed, bleached and/or unbleached pulps, paper and cardboard being especially preferred. Accordingly, a preferred carrier layer comprises a multitude of fibres. The basis weight of the carrier layer is preferably in a range from 120 to 450 g/m², especially preferably in a range from 130 to 400 g/m² and most preferably in a range from 150 to 380 g/m². A preferred cardboard generally has a single-layer or multilayer structure and may have been coated on one or both sides with one or else more than one cover layer. In addition, a preferred cardboard has a residual moisture content of less than 20% by weight, preferably of 2% to 15% by weight and especially preferably of 4% to 10% by weight, based on the total weight of the cardboard. An especially preferred cardboard has a multilayer structure. Further preferably, the cardboard has, on the surface facing the environment, at least one lamina, but more preferably at least two laminas, of a cover layer known to the person skilled in the art as a "paper coating". In addition, a preferred cardboard has a Scott bond value (according to Tappi T403 um) in a range from 100 to 360 J/m², preferably from 120 to 350 J/m² and especially preferably from 135 to 310 J/m². By virtue of the aforementioned ranges, it is possible to provide a composite from which it is possible to fold a container with high tightness, easily and in low tolerances.

The carrier layer is characterized by a bending resistance which can be measured with a bending tester according to ISO 2493-2:2011 at a bending angle of 15°. The bending tester used is a L&W Bending Tester code 160 from Lorentzen & Wettre, Sweden. The carrier layer preferably has a bending resistance in a first direction in a range from 80 to 550 mN. In the case of a carrier layer that comprises a multitude of fibres, the first direction is preferably a direction of orientation of the fibres. A carrier layer that comprises a multitude of fibres also preferably has a bending resistance in a second direction, perpendicular to the first direction, in a range from 20 to 300 mN. The samples used for measuring the bending resistance with the above measuring device have a width of 38 mm and a clamping length of 50 mm. A preferred sheetlike composite with the carrier layer has a bending resistance in the first direction in a range from 100 to 700 mN. Further preferably, the aforementioned sheetlike composite has a bending resistance in the second direction in a range from 50 to 500 mN. The samples of the sheetlike composite used for measuring with the above measuring device also have a width of 38 mm and a clamping length of 50 mm.

Barrier Layer

The barrier layer used may be any material which is suitable for a person skilled in the art for this purpose and which has sufficient barrier action, especially with respect to oxygen. The barrier layer is preferably selected from a. a plastic barrier layer;
b. a metal layer;
c. a metal oxide layer; or
d. a combination of at least two of a. to c.

If the barrier layer, according to alternative a., is a plastic barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastics, especially thermoplastics, here include N- or O-bearing plastics, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the plastic barrier layer has a basis weight in a range from 2 to 120 g/m², preferably in a range from 3 to 60 g/m², especially preferably in a range from 4 to 40 g/m² and further preferably from 6 to 30 g/m². Further preferably, the plastic barrier layer is obtainable from melts, for example by extrusion, especially laminar extrusion. Further preferably, the plastic barrier layer may also be introduced into the sheetlike composite via lamination. It is preferable in this context that a film is incorporated into the sheetlike composite. In another embodiment, it is also possible to select plastic barrier layers obtainable by deposition from a solution or dispersion of plastics.

Suitable polymers preferably include those having a weight-average molecular weight, determined by gel permeation chromatography (GPC) by means of light scattering, in a range from $3 \cdot 10^3$ to $1 \cdot 10^7$ g/mol, preferably in a range from $5\cdot 10^3$ to $1\cdot 10^6$ g/mol and especially preferably in a range from $6\cdot 10^3$ to $1\cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two of these, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm$^3$, preferably in a range from 1.05 to 1.30 g/cm$^3$ and especially preferably in a range from 1.08 to 1.25 g/cm$^3$. It is also preferable that the PA has a viscosity number in a range from 130 to 250 ml/g and preferably in a range from 140 to 220 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all of the following properties:

- an ethylene content in a range from 20 to 60 mol %, preferably from 25 to 45 mol %;
- a density in a range from 1.0 to 1.4 g/cm$^3$, preferably from 1.1 to 1.3 g/cm$^3$;
- a melting point in a range from more than 155 to 235° C., preferably from 165 to 225° C.;
- an MFR value (210° C./2.16 kg when $T_{S(EVOH)}$<230° C.; 230° C./2.16 kg when 210° C.<$T_{S(EVOH)}$<230° C.) in a range from 1 to 25 g/10 min, preferably from 2 to 20 g/10 min;
- an oxygen permeation rate in a range from 0.05 to 3.2 cm$^3\cdot$20 μm/m$^2\cdot$day·atm, preferably in a range from 0.1 to 1 cm$^3\cdot$20 μm/m$^2\cdot$day·atm.

Preferably at least one polymer layer, further preferably the inner polymer layer, or preferably all polymer layers, has/have a melting temperature below the melting temperature of the barrier layer. This is especially true when the barrier layer is formed from polymer. The melting temperatures of the at least one polymer layer, especially the inner polymer layer, and the melting temperature of the barrier layer preferably differ here by at least 1 K, especially preferably by at least 10 K, still more preferably by at least 50 K, even more preferably by at least 100 K. The temperature difference should preferably be chosen to be only of such an amount that there is no melting of the barrier layer, especially no melting of the plastic barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 μm, preferably in a range from 3.5 to 12 μm and especially preferably in a range from 4 to 10 μm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a particular configuration, the metal layer consists of an aluminium foil. Suitable aluminium foils have a ductility of more than 1%, preferably of more than 1.3% and especially preferably of more than 1.5%, and a tensile strength of more than 30 N/mm$^2$, preferably more than 40 N/mm$^2$ and especially preferably more than 50 N/mm$^2$. Suitable aluminium foils exhibit in the pipette test a droplet size of more than 3 mm, preferably more than 4 mm and especially preferably of more than 5 mm. Suitable alloys for producing aluminium layers or foils are commercially available under the designations EN AW 1200, EN AW 8079 or EN AW 8111 from Hydro Aluminium Deutschland GmbH or Amcor Flexibles Singen GmbH. In the case of a metal foil as a barrier layer, it is possible to provide an adhesion promoter layer between the metal foil and a closest polymer layer on one and/or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a plastic layer, for example an oriented polypropylene film. A preferred process for this purpose is physical gas phase deposition.

In a further preferred embodiment, the metal layer or the metal oxide layer may take the form of a layer composite composed of one or more polymer layers with a metal layer. Such a layer is obtainable, for example, by vapour deposition of metal on a plastic layer, for example an oriented polypropylene film. A preferred process for this purpose is physical gas phase deposition.

Adhesion/Adhesion Promoter Layer

An adhesion promoter layer may be present between layers which do not directly adjoin one another, preferably between the barrier layer and the inner polymer layer. Useful adhesion promoters in an adhesion promoter layer include all plastics which are suitable for producing a firm bond through functionalization by means of suitable functional groups, through the forming of ionic bonds or covalent bonds with a surface of a respective adjacent layer.

Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or the Escor®6000ExCo trade name by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as the carrier layer.

Polyolefin

A preferred polyolefin is a polyethylene (PE) or a polypropylene (PP) or both. A preferred polyethylene is one selected from the group consisting of an LDPE, an LLDPE, and an HDPE, or a combination of at least two of these. A further preferred polyolefin is an mPolyolefin (polyolefin prepared by means of a metallocene catalyst). Suitable polyethylenes have a melt flow rate (MFR=MFI–melt flow index) in a range from 1 to 25 g/10 min, preferably in a range from 2 to 20 g/10 min and especially preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

mPolymer

An mPolymer is a polymer which has been prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two of these.

Extrusion

In the extrusion, the polymers are typically heated to temperatures of 210 to 350° C., measured at the molten polymer film beneath the exit from the extruder die. The extrusion can be effected by means of extrusion tools which are known to those skilled in the art and are commercially available, for example extruders, extruder screws, feed block, etc. At the end of the extruder, there is preferably an opening through which the polymer melt is pressed. The opening may have any shape that allows extrusion of the polymer melt. For example, the opening may be angular, oval or round. The opening is preferably in the form of a slot of a funnel. Once the melt layer has been applied to the substrate layer by means of the above-described process, the melt layer is left to cool down for the purpose of heat-setting, this cooling preferably being effected by quenching via contact with a surface which is kept at a temperature in a range from 5 to 50° C., especially preferably in a range from 10 to 30° C. Subsequently, at least the flanks are separated from the area. The separation may be carried out in any way that is familiar and appears suitable to a person skilled in the art for separating the flanks quickly, as precisely as possible and cleanly. Preferably, the separation is effected by means of a knife, laser beam or waterjet, or a combination of two or more thereof, the use of knives being especially preferable, especially a cup wheel knife.

Food or Drink Product

In the context of the invention, the sheetlike composite and the container precursor are preferably designed for production of a food or drink product container. In addition, the closed container according to the invention is preferably a food or drink product container. Food and drink products include all kinds of food and drink known to those skilled in the art for human consumption and also animal feeds. Preferred food and drink products are liquid above 5° C., for example milk products, soups, sauces, non-carbonated drinks Container Precursor A container precursor is a precursor of the closed container which arises in the course of production of a closed container. In this context, the container precursor comprises the sheetlike composite in the form of a blank. In this context, the sheetlike composite may be in an unfolded or folded state. A preferred container precursor has been cut to size and is designed for production of a single closed container. A preferred container precursor which has been cut to size and is designed for production of a single closed container is also referred to as a shell or sleeve. In this context, the shell or sleeve comprises the sheetlike composite in folded form. In addition, the container precursor preferably takes the form of an outer shell of a prism. A preferred prism is a cuboid. Moreover, the shell or sleeve comprises a longitudinal seam and is open in a top region and a base region. A typical container precursor which has been cut to size and is designed for production of a multitude of closed containers is often also referred to as a tube.

A further preferred container precursor is open, preferably in a top region or a base region, more preferably in both. A preferred container precursor is in the form of a shell or tube or both. A further preferred container precursor comprises the sheetlike composite in such a way that the sheetlike composite has been folded at least once, preferably at least twice, more preferably at least 3 times, most preferably at least 4 times. A preferred container precursor is in one-piece form. More preferably, a base region of the container precursor is in a one-piece design with a lateral region of the container precursor.

Container

The closed container according to the invention may have a multitude of different forms, but preference is given to an essentially cuboidal structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used especially in the top or base regions of the container. In this context, however, it is preferable that the container is formed from the sheetlike composite to an extent of at least 50%, especially preferably to an extent of at least 70% and further preferably to an extent of at least 90% of the area. Further, the container may have a device for emptying the contents. This may be formed, for example, from a polymer or mixture of polymers and be attached on the outer face of the container. It is also conceivable that this device has been integrated into the container by "direct injection moulding". In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include the longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product. Preferably, the closed container does not comprise any lid or base, or either, that has not been formed in one piece with the sheetlike composite. A preferred closed container comprises a food or drink product.

Hole

The at least one hole that is provided in the carrier layer according to preferred embodiments may have any shape that is known to a person skilled in the art and suitable for various closures or drinking straws. The holes often have rounded portions in plan view. Thus, the holes may be essentially circular, oval, elliptical or drop-shaped. The shape of the at least one hole in the carrier layer usually also predetermines the shape of the opening that is produced either by an openable closure which is connected to the container and through which the content of the container is dispensed from the container after opening, or by a drinking straw in the container. Consequently, the openings of the opened container often have shapes that are comparable to or even the same as the at least one hole in the carrier layer. Configurations of the sheetlike composite with a single hole primarily serve for letting out the food or drink product located in the container that is produced from the sheetlike composite. A further hole may be provided, especially for letting air into the container while the food or drink product is being let out.

In the context of covering the at least one hole of the carrier layer, it is preferred that the hole-covering layers are joined to one another at least partially, preferably to the extent of at least 30%, preferably at least 70% and especially preferably at least 90%, of the surface area formed by the at least one hole. It is also preferred that the hole-covering layers are joined to one another at the edges of the at least one hole and preferably lie against the edges when they are joined, in order in this way to achieve improved tightness by a joining connection that extends over the entire surface area of the hole. The hole-covering layers are often joined to one another by way of the region that is formed by the at least one hole in the carrier layer. This leads to a good tightness of the container formed from the composite, and consequently to a desired long shelf life of the food or drink products kept in the container.

Measuring Methods

The following measuring methods were used within the context of the invention. Unless stated otherwise, the measurements were conducted at an ambient temperature of 23° C., an ambient air pressure of 100 kPa (0.986 atm) and a relative air humidity of 50%.

MFR

MFR is measured according to standard ISO 1133 (unless stated otherwise at 190° C. and 2.16 kg).

Density

Density is measured according to standard ISO 1183-1.

Melting Temperature

Melting temperature is determined on the basis of the DSC method ISO 11357-1, -5. The instrument is calibrated according to the manufacturer's instructions on the basis of the following measurements:
 temperature indium—onset temperature,
 heat of fusion indium,
 temperature zinc—onset temperature.

Oxygen Permeation Rate

Oxygen permeation rate is determined according to standard ISO 14663-2 Appendix C at 20° C. and 65% relative air humidity.

Viscosity Number of PA

The viscosity number of PA is measured according to the standard DIN EN ISO 307 (2013-08) in 95% sulfuric acid.

Molecular Weight Distribution

Molecular weight distribution is measured by gel permeation chromatography by means of light scattering: ISO 16014-3/-5 (2009-09).

Moisture Content of Cardboard

The moisture content of the cardboard is measured according to the standard ISO 287:2009.

Adhesion of Layers to One Another

The adhesion of two adjacent layers is determined by fixing them in a 90° peel test instrument, for example the Instron "German rotating wheel fixture", on a rotatable roller which rotates at 40 mm/min during the measurement. The samples had been cut beforehand into strips 15 mm wide. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Colour Value (L* Value)

The measuring instrument used was a spectrophotometer with densitometer function—SpectroEye™ from X-Rite, 8105 Regensdorf, Switzerland. To conduct the measurement of the colour value, a specimen of dimensions 3 cm×10 cm was cut out of the laminate and analysed with the measuring instrument according to the operating instructions supplied by the manufacturer.

Area Coverage

The area coverage is a measure of the extent to which a colour surface appears to be covered to a normal observer. The area coverage can be calculated by the Murray-Davies formula. All area coverage values in this document were measured with the aid of a spectrophotometer (SpectroEye™) from X-Rite (Ch-8105 Regensdorf).

Bond Strength of Outer Layers

The bond strength of an ink layer is understood to mean the resistance of the ink layer to forces that occur when an adhesive strip is torn off a surface of the ink layer. The adhesive strip used in the test is Tesaband 4104 adhesive tape, width 20 mm, from the manufacturer Beiersdorf AG, Hamburg. The laminate to be tested is placed with the ink layer upward on a hard, smooth and flat base. For each test run, a strip of the Tesaband 4104 adhesive tape is stuck onto the ink layer at least over a length of 30 mm and pressed on homogeneously by thumb. The test is effected within 30 seconds after the Tesafilm adhesive tape has been stuck on. Longer residence times on the ink layer can lead to different results. The test is effected either in that
 a. the adhesive strip is pulled off sharply at an angle of 90°, or b. the adhesive strip is pulled off by gradual peeling (at an angle of less than 45° relative to the ink layer).

For each of the two test methods a. and b., 3 test runs are conducted at different sites of the ink layer. The results are assessed by the naked eye using the scale below. The results improve from 1 to 5:

5—ink layer not pulled off
4—spots of ink layer pulled off at individual sites
3—distinct areas of ink layer pulled off at individual sites
2—ink layer pulled off over large areas
1—ink layer pulled off completely, based on the area of the adhesive strip The 6 results are used to form the mean, which corresponds to the end result of the measurement.

Stability to Elevated Temperature and Humidity

The laminates to be tested are subjected to moisture and heat in a water bath at a temperature of 94° C. for 60 seconds. The water bath is within a beaker and is constantly stirred with a magnetic stirrer in order to assure a homogeneous temperature distribution. The temperature is checked with a thermometer and the time is measured with a stopwatch. After the 60 seconds, the laminate remains in the water bath, where the ink layer is rubbed with a glass rod having rounded ends under gentle pressure. Subsequently, the laminate is removed from the water bath and the ink layer is checked for damage by the naked eye. For this purpose, 3 test runs in each case are conducted at different sites of the ink layer. In this study, it should always be ensured that the duration of the rubbing treatment with the glass rod and the pressure exerted are about the same for all samples. For this purpose, the tests in a comparative test series should always be conducted by the same person.

The assessment is made according to the following scale, the result improving from 1 to 5:

1—the ink layer can be scratched off completely
2—the ink layer is significantly damaged
3—the ink layer is less severely but distinctly damaged
4—the ink layer is only slightly damaged
5—the ink layer is undamaged The 3 results are used to form the mean, which corresponds to the end result of the measurement.

Surface Tension

For determination of the surface tension of a polymer layer or an outer face, first of all, the contact angle for wetting with water ("water contact angle") is determined according to the standard ASTM D5946-09. In this case, samples of dimensions 30 mm×35 mm are cut out of the laminate with a scalpel. 10 measurements are conducted on each sample, from which the mean is calculated. Prior to the measurement, the samples are prepared according to section 10.2 of the standard. The test conditions are chosen according to section 10.4. Proceeding from the measured contact angle for water, the surface tension in dyn/cm (dyn/cm=mN/m) is read off from table X2.1 of Annex X2 of the standard.

Proportions of Aliphatic Groups and Aromatic Groups

The proportions of aliphatic groups and aromatic groups in a layer or composition are determined by means of ATR infrared spectroscopy. For this purpose, the layer or composition is analysed with an FT-IR microscope—Thermo Scientific Nicolet™ iN™ 10 MX Infrared Imaging Microscope from Thermo Fisher Scientific Inc. An ATR spectrum of the sample to be analysed that covers the wavenumber range from 3500 to 1400 cm$^{-1}$ with a resolution of 4 cm$^{-1}$ is recorded at 45° by means of a diamond as detector tip. The spectrum measured comprises a first maximum of the absorption/extinction measured in the wavenumber range from 2900 to 2950 cm$^{-1}$. This first maximum is caused by the vibration of C—H$_2$ groups (aliphatic groups). In addition, the spectrum comprises a further maximum in the wave number range from 1590 to 1610 cm$^{-1}$. This further maximum corresponds to the C=C vibration (aromatic groups). The areas of the vibration maxima present are determined by integration by means of the microscope software (Thermo Scientific™ OMNIC™ Series Software, Version 8.2 from Thermo Fisher Scientific Inc.). The area under the maximum for a particular group herein is the proportion of the respective group in the sample analysed. The respective ratios of these proportions are determined by quotient formation.

Isocyanate Content

The isocyanate content (NCO content) is determined according to standard DIN EN ISO 14896 (2009-07). For this purpose, method A (toluene/dibutylamine with aqueous HCl) with potentiometric indication of the endpoint is employed. The molar isocyanate content (molar NCO content) is calculated according to the following equation from the NCO content as determined above:

molar NCO content [mol/g]=NCO content [% by wt. corresponding to g/100 g]/(42 g/mol·100)

Hydroxyl Number

The hydroxyl number (OHN in mg KOH/g) is determined according to the standard DIN53240-2 (2007-11), where the acetylation time is 60 minutes and the result is determined by potentiometric means. The hydroxyl number (OHN) is used to calculate the molar OH content by the following equation:

molar OH content [mol/g]=OHN [mg KOH/g]/(56 g/mol·1000)

The invention is described in more detail hereinafter by examples and drawings, although the examples and drawings do not imply any restriction of the invention. Also, unless otherwise indicated, the drawings are not to scale.

Laminate Construction

For the examples (inventive) and comparative examples (noninventive), unprinted laminates with the layer structure and layer sequence which follows were prepared by a layer extrusion method.

TABLE 1

General construction of the unprinted example and comparative example laminates

| Layer designation | Material | Basis weight [g/m$^2$] |
|---|---|---|
| Outer polymer layer | PP Daploy SF313HMS, Borealis, Vienna | 30 |
| Carrier layer | Paperboard: Stora Enso Natura T Duplex twice-coated, Scott bond 200 J/m$^2$, residual moisture content 7.5% | 210 |
| Polymer interlayer | PP Daploy SF313HMS, Borealis, Vienna | 20 |
| Barrier layer | aluminium foil, EN AW 8079 from Hydro Aluminium Deutschland GmbH | here: thickness 9 μm |
| Adhesion promoter layer | Admer; Mitsui; Japan | 6 |
| Inner polymer layer | PP Daploy SF313HMS, Borealis, Vienna | 30 |

Laminate Production

The laminate is produced with an extrusion coating system from Davis Standard. The extrusion temperature here is in a range from about 280 to 330° C. Deviations in temperature of ±6° C. are within the normal tolerance. Deviations in basis weight of ±3 g/m² are within the normal tolerance. In the first step, the carrier layer, for each container to be produced, is provided with a hole and then the outer polymer layer is applied to the carrier layer. In the second step, the barrier layer is applied together with the polymer interlayer to the carrier layer that has been coated with the outer polymer layer beforehand. Subsequently, the adhesion promoter layer and the inner polymer layer are co-extruded onto the barrier layer. For application of the individual layers, the polymers are melted in an extruder. In the case of application of a polymer in a layer, the resultant melt is transferred via a feed block into a nozzle and extruded onto the carrier layer.

were adjusted by titration according to the test methods specified above. Subsequently, the chromatic ink printed on was likewise hardened/dried by blowing with a fan for 10 min.

Only in Comparative Example 1 was a PP layer of Daploy SF313HMS from Borealis, Vienna (basis weight 30 g/m²) applied to the hardened chromatic ink layer by laminar extrusion. In all the examples and comparative examples, the outer faces of the printed laminates thus obtained were examined according to the test methods described above for bond strength of the chromatic ink layers, for stability of the chromatic ink layers at elevated temperature and moisture content, and for the reproduction of light tonal values in the chromatic ink layers.

TABLE 2

Molar isocyanate contents (NCO contents) and OH contents in the ready-to-print liquid primers and chromatic inks from the examples and comparative examples and NCO contents in the hardened primer prior to printing with the chromatic ink

| | Liquid primer | Liquid chromatic ink | Hardened primer |
|---|---|---|---|
| Example 1 | NCO content: 83 mol/g<br>OH content: 44 mol/g | NCO content: 23 mol/g<br>OH content: 32 mol/g | NCO content: 39 mol/g |
| Example 2 | NCO content: 83 mol/g<br>OH content: 44 mol/g | NCO content: —<br>OH content: 32 mol/g | NCO content: 39 mol/g |
| Comparative Example 1 | NCO content: 44 mol/g<br>OH content: 44 mol/g | NCO content: —<br>OH content: 32 mol/g | NCO content: — |
| Comparative Example 2 | NCO content: 44 mol/g<br>OH content: 44 mol/g | NCO content: —<br>OH content: 32 mol/g | NCO content: — |
| Comparative Example 3 | NCO content: 44 mol/g<br>OH content: 44 mol/g | NCO content: 23 mol/g<br>OH content: 32 mol/g | NCO content: — |

Printing

The laminates as described above were subsequently printed in an intaglio printing method. First of all, the outer polymer layer was subjected to a corona treatment with an AVE-250E instrument from AFS Entwicklungs- and Vertriebs GmbH, Germany. The input power and the voltage of the corona treatment were chosen so as to obtain a surface tension of the outer polymer layer of 42 dyn/cm directly after the corona treatment. The corona treatment was followed immediately by the printing onto the treated outer polymer layer in multiple steps, and the printing was conducted in each case in the form of intaglio printing with a printing system from Kochsiek, Germany. A liquid white primer was printed onto the treated outer polymer layer over the full area (area coverage of about 100%). The liquid primers here contained, in the examples and comparative examples, Desmodur N100 and Desmodur L75H from Covestro, Germany; PV 86 Weiss from Siegwerk Druckfarben AG, Siegburg, Germany; and ethyl acetate as solvent. These components were mixed with one another in ratios so as to achieve the contents specified in Table 2 in the liquid primer. These contents were determined by titration according to the test methods specified above. The primer was hardened by blowing with a fan for 10 min. Unless stated otherwise below, the hardening was effected at a temperature of 23° C. Subsequently, a liquid chromatic ink of the VB67 type from Siegwerk Druckfarben AG, Siegburg, Germany with ethanol as solvent, in a further intaglio printing method, was printed onto the hardened primer in an area coverage of 70%. Only in Example 1 and Comparative Example 3 did the chromatic ink printed on contain, in addition to the VB67, a proportion of Desmodur L75H from Covestro, Germany, such that the contents specified in Table 2 were also attained for the liquid chromatic ink. These contents too To examine the reproduction of light tonal values, the laminate as described above is printed region by region with the liquid primer and the chromatic ink with constant colour pigment concentration in test fields of equal size with different small tonal values in each case (5%, 10%, 15%, 20%, 25%, 30%, 35% and 40%). The coloured test fields obtained after drying are examined by the naked eye. It is advantageous here when very substantially all small tonal values can be readily distinguished.

Container Production

Grooves, especially longitudinal grooves, were introduced into the printed laminates obtained as described above. In addition, the grooved laminate was divided into blanks for individual containers, each blank including one of the above holes. By folding along the 4 longitudinal grooves of each and every blank and sealing of overlapping fold faces, a shell-shaped container precursor of the shape shown in FIG. 5 was obtained in each case. This shell was used to produce a closed container of the shape shown in FIG. 6 in a CFA 712 standard filling machine, SIG Combibloc, Linnich. This involved producing a base region by folding and sealing by heat-sealing. This gave rise to a beaker that was open at the top. The beaker was sterilized with hydrogen peroxide. In addition, the beaker was filled with water. By folding and ultrasound sealing, the top region of the beaker including the hole was closed and hence a closed container was obtained. An opening aid was secured on this container in the region of the hole. The containers thus obtained were autoclaved in a rotary autoclave in a moist steam atmosphere. The autoclaving comprised a heating phase for 13 min, a hold time at 125° C. for 42 min and a cooling phase for 25 min. The chamber pressure was 2.6 bar and the rotation was at 3 revolutions/min. Subsequently, the autoclaved containers were examined for damage to the chromatic ink layer by the naked eye, in order to determine the autoclavability thereof. Evaluation was effected according to the scale which follows. The test results in this regard are reported in Table 3.

++: no damage to the ink layer visible by eye

+: slight, barely visible damage to the ink layer

−: significant damage to the ink layer visible by eye

Evaluation

The results of the studies conducted in the context of the examples and comparative examples are summarized in the tables which follow.

TABLE 3

Evaluation of the examples and comparative examples with regard to bond strength, autoclavability and the reproduction of light tonal values, in each case of the hardened chromatic ink applications

|  | Bond strength of the chromatic ink layer | Stability of the chromatic ink layer at elevated temperature and humidity | Autoclave stability of the chromatic ink layer | Minimum light tonal value obtainable [%] |
|---|---|---|---|---|
| Example 1 | 4 | 4 | + | 15 |
| Example 2 | 5 | 5 | ++ | 5 |
| Comparative Example 1 | 5 | 5 | ++ | 5 |
| Comparative Example 2 | 1 | 1 | − | 5 |
| Comparative Example 3 | 2 | 2 | − | 15 |

As well as the advantages of the inventive examples that are apparent in Table 3, it should be noted that an additional PP layer has been applied to the laminate for Comparative Example 1. This additional method step prolongs the duration of the process and considerably increases the manufacturing costs. Moreover, it should be noted that, in the case of production according to Example 1 and Comparative Example 3, the finite pot lives of the chromatic ink to be crosslinked give rise to chemical waste which has to be disposed of in a costly manner.

Examples 3 to 7 detailed hereinafter were conducted like the above Example 2. More particularly, the same primer and the same chromatic ink were used. However, a difference was that the liquid primers printed on were hardened by blowing with a fan at the temperatures specified in Table 4.

TABLE 4

Drying temperatures of the primer in further inventive examples

| | Hardening of the primer at temperature [° C.] |
|---|---|
| Example 3 | 23 |
| Example 4 | 30 |
| Example 5 | 35 |
| Example 6 | 40 |
| Example 7 | 50 |

TABLE 5

Process properties of the printing processes conducted for the application of the primer and the chromatic ink layer in the further examples

| | Energy consumption in the printing process | Processing properties of the laminate printed with the primer | Maximum laminate speed in the printing process [m/min] |
|---|---|---|---|
| Example 3 | ++ | ++ | 400 |
| Example 4 | + | ++ | 380 |
| Example 5 | o | ++ | 300 |
| Example 6 | − | + | 220 |
| Example 7 | −− | − | 150 |

In Table 5 above, the symbols have the following meanings for the energy consumption in the printing process: ++ lower energy consumption than +, + lower energy consumption than o, o lower energy consumption than −, − lower energy consumption than −−.

The processing properties of the laminate printed with the primer that are reported in Table 5 are determined via the deposition characteristics. The deposition characteristics describe the unintentional buildup of primer material on the deflecting rolls of the printing machine. "++" means that no such buildup is observed. A "+" indicates buildup of primer material on the deflecting rolls of the printing machine that still enables faultless production without cleaning of the deflecting rolls. A "−" indicates buildup of primer material on the deflecting rolls of the printing machine that does not enable faultless production without cleaning of the deflecting rolls.

Figure 2:
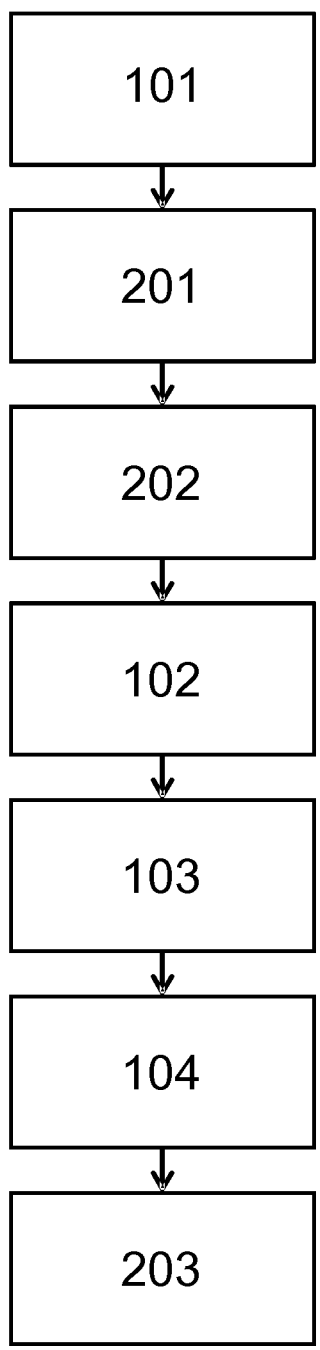
Figure 3:
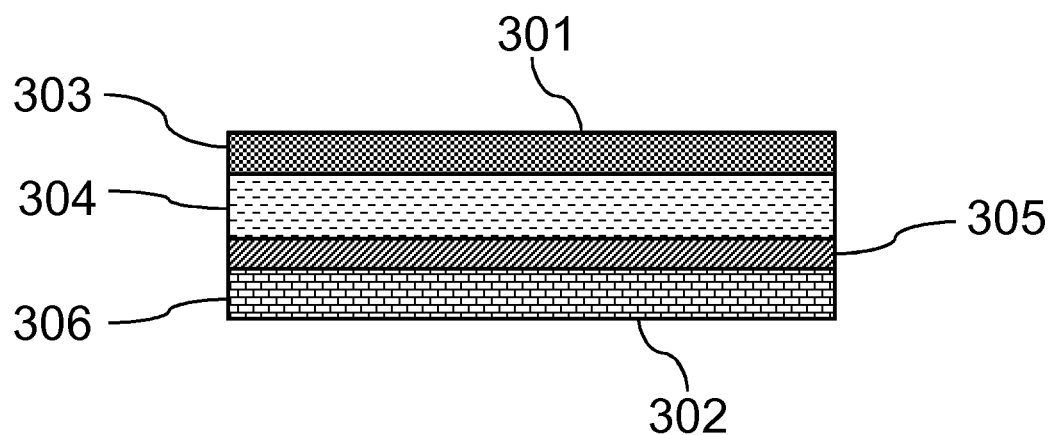
Figure 4:
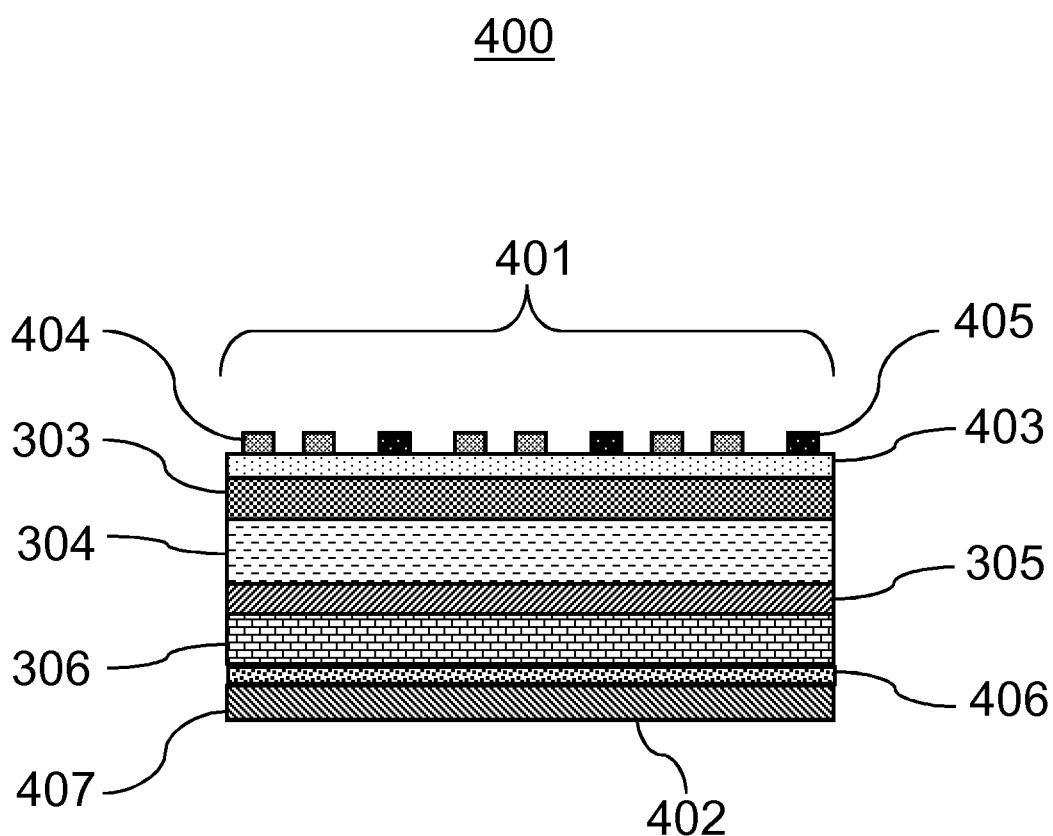
Figure 5:
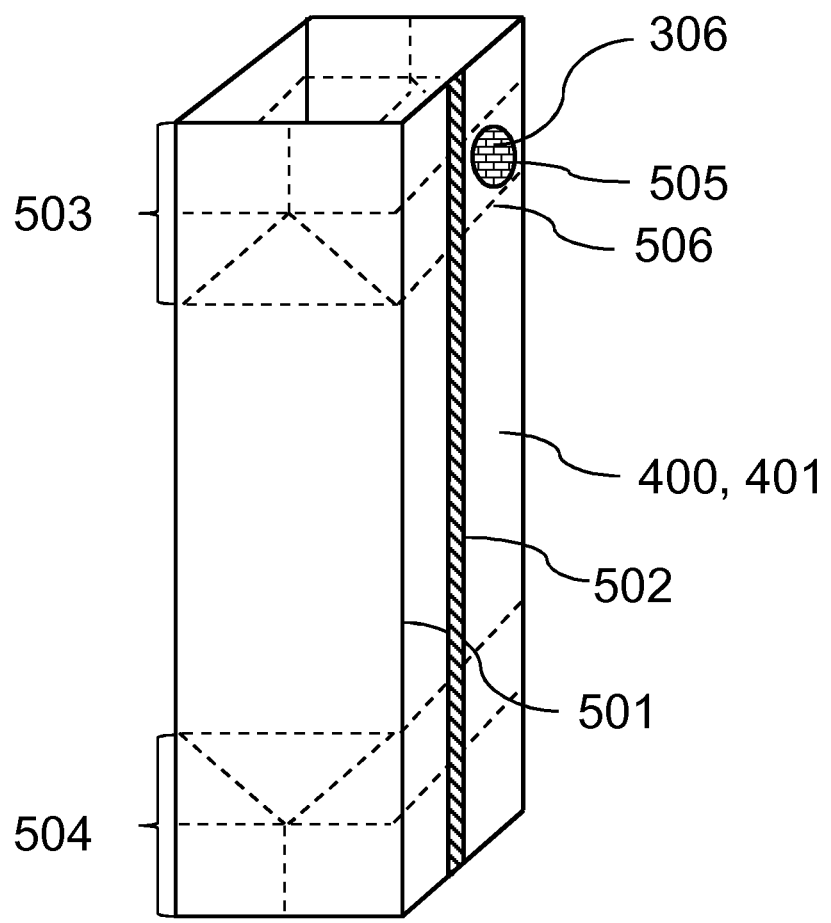
Figure 6:
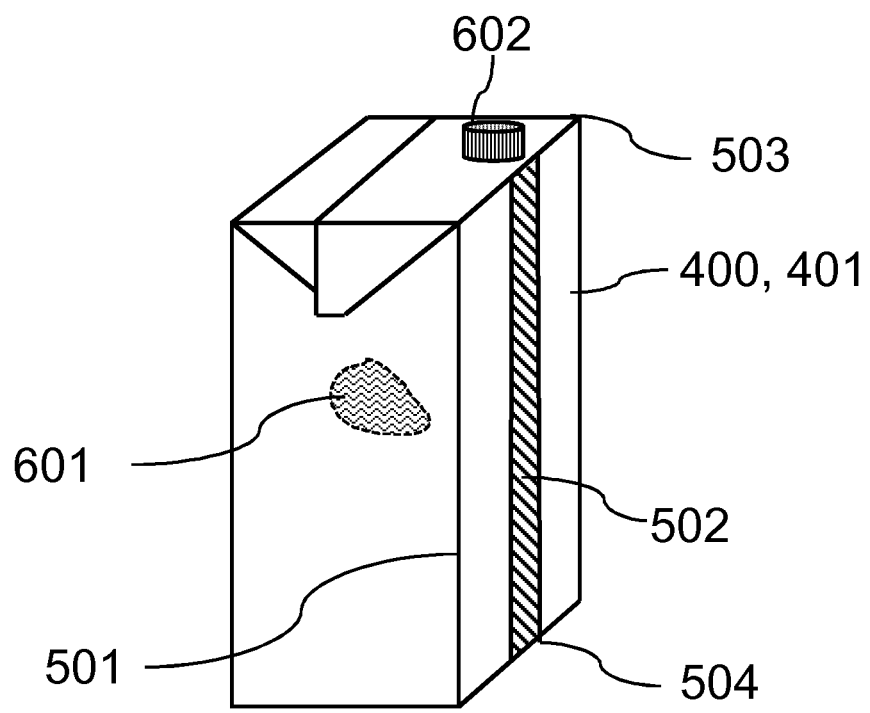
Figure 7:
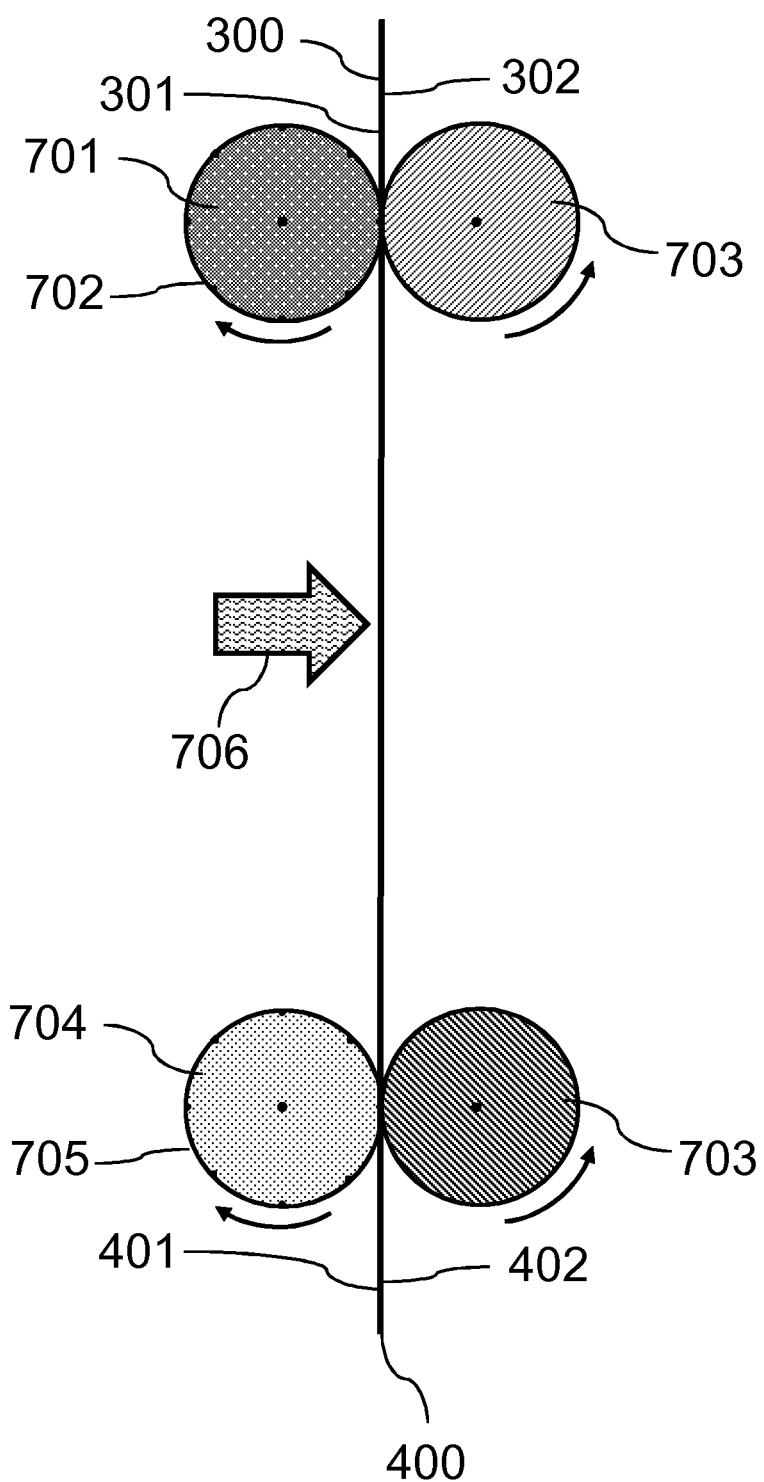
Figure 8:
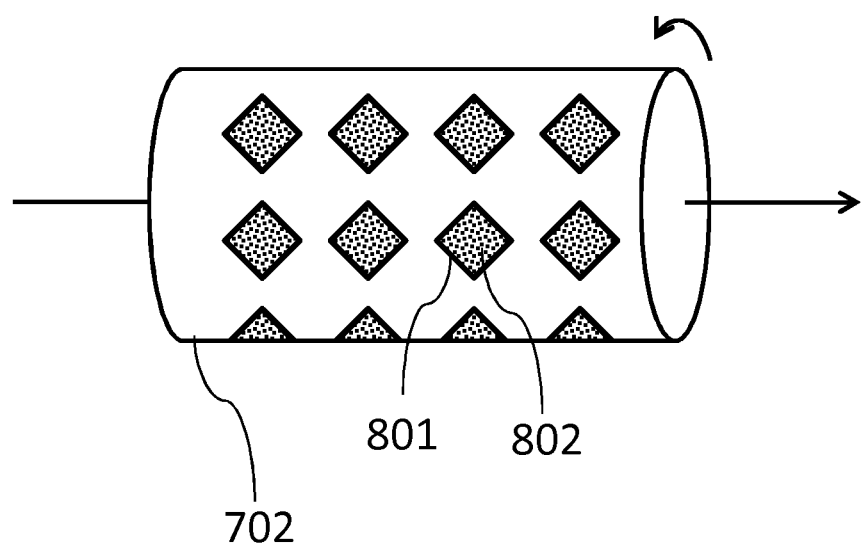

The figures repectively show, in schematic form and not to scale, unless stated otherwise in the description or the respective figure:

FIG. 1 a flow diagram of a method according to the invention;

FIG. 2 a flow diagram of a further method according to the invention;

FIG. 3 a schematic diagram of a section of a sheetlike composite precursor of the invention in cross section;

FIG. 4 a schematic diagram of a section of a sheetlike composite of the invention in cross section;

FIG. 5 a schematic diagram of a container precursor according to the invention;

FIG. 6 a schematic diagram of a closed container according to the invention;

FIG. 7 a schematic diagram of an apparatus for executing a method according to the invention; and FIG. 8 a schematic diagram of the first printing form of the apparatus of FIG. 7.

FIG. 1 shows a flow diagram of a method 100 according to the invention. The method 100 comprises a method step a) 101: providing the sheetlike composite precursor 300 of FIG. 3. In a subsequent method step b) 102, the outer face 301 of the sheetlike composite precursor 300 is overlaid with a liquid first polymer composition 802. In a method step c) 103, the liquid first polymer composition 802 is hardened, thereby obtaining a first polymer layer 403. In a subsequent method step d) 104, the outer face 301 of the sheetlike composite precursor 300 is overlaid with a liquid second polymer composition. After the hardening of method step c) 103, the first polymer layer 403 in method step d) 104 has an isocyanate content of 10% by weight, based on the weight of the first polymer layer 403.

FIG. 2 shows a flow diagram of a further method 100 according to the invention. The method 100 comprises a method step a) 101: providing the sheetlike composite precursor 300 of FIG. 3. In a subsequent method step I. 201, the barrier layer 306 is overlaid on a side of the barrier layer 306 remote from the carrier layer 306 with an adhesion promoter composition composed of Escor 6000 HSC from Exxon Mobil Corporation (basis weight 4 g/m$^2$) and LDPE 19N430 from Ineos GmbH, Cologne (basis weight 22 g/m$^2$) and an inner polymer composition composed of a blend of 65% by weight of LDPE 19N430 from Ineos Köln GmbH and 35% by weight of Eltex 1315 AZ from Ineos Köln GmbH (blend basis weight 10 g/m$^2$). In a subsequent method step II. 202, a surface of the outer polymer layer 303 remote from the carrier layer 306 is subjected to a corona treatment and hence the surface tension thereof is increased to 41 dyn/cm. In a method step b) 102, this surface of the outer polymer layer 303 is printed with a liquid first polymer composition 802. In this case, the liquid first polymer composition 802 comprises an isocyanate content of 32% by weight and an OH content of 24% by weight. In a method step c) 103, the liquid first polymer composition 802 is hardened, thereby obtaining a first polymer layer 403 by blowing with air of temperature 25° C. After the hardening of method step c) 103, the first polymer layer 403 in a subsequent method step d) 104 has an isocyanate content of 8% by weight. In method step d) 104, the first polymer layer 403 is printed with a liquid second polymer composition which is hardened to give a second polymer layer 404. In the printing, the liquid second polymer composition comprises an isocyanate content of 0% by weight and an OH content of 18% by weight. In a subsequent method step e) 203, the first polymer layer 403 is printed with a liquid further polymer composition which is hardened to give a further polymer layer 405. In the printing, the liquid further polymer composition comprises an isocyanate content of 0% by weight and an OH content of 18% by weight. The sheetlike composite 400 thus obtained is shown in FIG. 4.

FIG. 3 shows a schematic diagram of a section of a sheetlike composite precursor 300 according to the invention in cross section. The sheetlike composite precursor 300 consists of the following layers in a layer sequence in the direction from an outer face 301 of the sheetlike composite precursor 300 to an inner face 302 of the sheetlike composite precursor 300: an outer polymer layer 303 of LDPE 19N430 from Ineos GmbH, Cologne (basis weight 15 g/m$^2$); a carrier layer 304 of a Stora Enso Natura T Duplex twice-coated cardboard (Scott bond 200 J/m$^2$, residual moisture content 7.5%, basis weight 210 g/m$^2$); a polymer interlayer 305 of LDPE 19N430 from Ineos GmbH, Cologne (basis weight 18 g/m$^2$); and a barrier layer 306 of an EN AW 8079 aluminium foil from Hydro Aluminium Deutschland GmbH (thickness 6 μm).

FIG. 4 shows a schematic diagram of a section of a sheetlike composite 400 according to the invention in cross section. The sheetlike composite 400 consists of the following layers of a layer sequence in the direction from an outer face 401 of the sheetlike composite 400 to an inner face 402 of the sheetlike composite 400: a second polymer layer 404 and a further polymer layer 405 obtainable by the method 100 according to the invention of FIG. 2 from the liquid second polymer composition and the liquid further polymer composition respectively; a first polymer layer 403 obtainable by the method 100 according to the invention of FIG. 2 from the liquid first polymer composition 802; an outer polymer layer 303 of LDPE 19N430 from Ineos GmbH, Cologne (basis weight 15 g/m$^2$); a carrier layer 304 of a Stora Enso Natura T Duplex twice-coated cardboard (Scott bond 200 J/m$^2$, residual moisture content 7.5%, basis weight 210 g/m$^2$); a polymer interlayer 305 of LDPE 19N430 from Ineos GmbH, Cologne (basis weight 18 g/m$^2$); a barrier layer 306 of an EN AW 8079 aluminium foil from Hydro Aluminium Deutschland GmbH (thickness 6 μm); an adhesion promoter layer 406 of Escor 6000 HSC from Exxon Mobil Corporation (basis weight 4 g/m$^2$) and LDPE 19N430 from Ineos GmbH, Cologne (basis weight 22 g/m$^2$); and an inner polymer layer 407 composed of a blend of 65% by weight of LDPE 19N430 from Ineos Köln GmbH and 35% by weight of Eltex 1315 AZ from Ineos Köln GmbH (Blend-basis weight 10 g/m$^2$). The first polymer layer 403 here comprises a polyurethane having aromatic and aliphatic groups. The polyurethane was obtained by a polyaddition of an aromatic polyisocyanate based on tolylene diisocyanate and an aliphatic polyisocyanate based on hexamethylene diisocyanate (HDI) with trimethylolpropane and a polyester containing OH groups from adipic acid. Further, the first polymer layer 403 comprises 30.9% by weight of TiO$_2$ (rutile type), based on the weight of the first polymer layer 403. Moreover, the first polymer layer 403 comprises SiO$_2$, polyvinyl chloride, cellulose acetobutyrate, polyadipate and polyolefin wax. In addition, the first polymer layer 403 is characterized by an L* value in the L*a*b* colour system of 90. In addition, the first polymer layer 403 has an area coverage of 100%, based on a surface of the outer polymer layer 303 adjoining the first polymer layer 403. The second polymer layer 404 comprises, to an extent of 9.3% by weight, based on the weight of the second polymer layer 404, a Pigment Yellow PY 13 and also 9% by weight of PVB, based on the weight of the second polymer layer 404, as binder, and a polyurethane. In addition, the second polymer layer 404 has an area coverage of 20%, based on the surface of the outer polymer layer 303 adjoining the first polymer layer 403. The further polymer layer 405 comprises, to an extent of 13.5% by weight, based on the weight of the further polymer layer 405, a Pigment Blue PB 15:3 and also 6% by weight of PVB, based on the weight of the second polymer layer 404, as binder, and a polyurethane. In addition, the further polymer layer 405 has an area coverage of 10%, based on the surface of the outer polymer layer 303 adjoining the first polymer layer 403. The second polymer layer 404 and the further polymer layer 405 each consist of a multitude of printed halftone dots. In this case, the second polymer layer 404 and the further polymer layer 405 form a colour decoration of the sheetlike composite 400, for which the first polymer layer 403 serves as white primer. The first polymer layer 403, the second polymer layer 404 and the further polymer layer 405 have all been obtained by intaglio printing. The sheetlike composite 400 is obtainable from the sheetlike composite precursor 300 of FIG. 3 by the method 100 according to the invention of FIG. 2.

FIG. 5 shows a schematic diagram of a container precursor 500 according to the invention. The container precursor 500 comprises the sheetlike composite 400 of FIG. 4 with 4 longitudinal folds 501, each of which forms an edge (longitudinal edge) 501. The sheetlike composite 400 is a blank for production of a single closed container 600. The container precursor 500 is in the form of a shell and comprises a longitudinal seam 502 in which a first longitudinal rim and a further longitudinal rim of the sheetlike composite 400 are sealed to one another. In addition, the container precursor 500 comprises a hole 505 in the carrier layer 304. The hole 505 is covered by the outer polymer layer 303 (not shown), the polymer interlayer 305 (not shown), the barrier layer 306, the adhesion promoter layer 406 (not shown) and the inner polymer layer 407 (not shown) as hole-covering layers. By folding along grooves 506 and joining of fold regions in a top region 503 and a base region 504 of the container precursor 500, a closed container 600 is obtainable. Such a closed container 600 is shown in FIG. 6.

FIG. 6 shows a schematic representation of a closed container 600 according to the invention. The closed container 600 has been produced from the container precursor 500 according to FIG. 5. The closed container 600 comprises a food or drink product 601 and has 12 edges 501. In addition, the closed container 600 is connected to a lid comprising an opening aid 602 which covers the hole 505 on the outer face 401 of the sheetlike composite 400. Here, the lid 602 comprises a cutting tool as opening aid in its interior.

FIG. 7 shows a schematic diagram of an apparatus for executing a method 100 according to the invention. The apparatus comprises a first printing form 701, here a first intaglio print roll, with an impression roll 703. By contacting of the outer face 301 of the sheetlike composite precursor 300 of FIG. 3 with a first printing form surface 702, the sheetlike composite precursor 300 can be printed with the liquid first polymer composition 802 according to method step b) 102 of the method 100 of FIG. 2. For this purpose, the impression roll 703 by contact with the inner face 302 of the sheetlike composite precursor 300, presses the outer face 301 against the first printing form surface 702. For hardening of the liquid first polymer composition 802 in method step c) 103, the outer face 301 is blown with a cold air stream 706 at a temperature of 30° C. Downstream of this, the apparatus comprises a second printing form 704, here a second intaglio print roll, with an impression roll 703. By contacting of the outer face 301 of the sheetlike composite precursor 300 with a second printing form surface 705, the sheetlike composite precursor 300 can be printed with the liquid second polymer composition according to method step d) 104 of the method 100 of FIG. 2. By hardening of the liquid second polymer composition, a sheetlike composite 400 according to the invention is obtained.

FIG. 8 shows a schematic diagram of the first printing form 701 of the apparatus of FIG. 7. The first printing form 701 is the first intaglio print roll of FIG. 7. What are shown here are recesses 801 from a first multitude of recesses which comprise the liquid first polymer composition 802 for printing of a sheetlike composite precursor 300.

LIST OF REFERENCE SIGNS

100 Method according to the invention
101 Method step a)
102 Method step b)
103 Method step c)
104 Method step d)
201 Method step I.
202 Method step II.
203 Method step e)
300 Sheetlike composite precursor
301 Outer face of the sheetlike composite precursor
302 Inner face of the sheetlike composite precursor
303 Outer polymer layer
304 Carrier layer
305 Polymer interlayer
306 Barrier layer
400 Sheetlike composite according to the invention
401 Outer face of the sheetlike composite
402 Inner face of the sheetlike composite
403 First polymer layer
404 Second polymer layer
405 Further polymer layer
406 Adhesion promoter layer
407 Inner polymer layer
500 Container precursor according to the invention
501 Longitudinal fold, edge
502 Longitudinal seam
503 Top region
504 Base region
505 Hole
506 Groove
600 Closed container according to the invention
601 Food or drink product
602 Lid with opening aid
701 First printing form
702 First printing form surface
703 Impression roll
704 Second printing form
705 Second printing form surface
706 Cold air stream
801 Recess/well
802 Liquid first polymer composition

The invention claimed is:

1. A method, comprising as method steps
a) providing a sheetlike composite precursor comprising a carrier layer;
b) overlaying the sheetlike composite precursor on an outer face of the sheetlike composite precursor with a liquid first polymer composition which comprises a first di- or polyisocyanate which has aromatic groups, a further di- or polyisocyanate which has aliphatic groups and at least one di- or polyol,
wherein the liquid first polymer composition is characterized by a ratio of a proportion of aromatic groups in the liquid first polymer composition to a proportion of aliphatic groups in the liquid first polymer composition in a range from 0.35 to 0.80;
c) hardening the liquid first polymer composition, thereby obtaining a first polymer layer,
wherein the hardening is effected at a temperature of the liquid first polymer composition and/or the first polymer layer in a range from 18 to 35° C.; and
d) overlaying the sheetlike composite precursor on the outer face of the sheetlike composite precursor with a liquid second polymer composition;
wherein the first polymer layer in method step c) comprises an isocyanate content in a range from 0.1% to 50% by weight, based on the weight of the first polymer layer;
wherein the liquid second polymer composition in the overlaying in method step d) comprises at least one first polyvinyl acetal in a proportion in a range from 2% to 12% by weight and a colorant in a proportion in a range from 2% to 15% by weight, in each case based on the weight of the liquid second polymer composition.

2. The method according to claim 1, wherein the liquid first polymer composition in method step b) is characterized by a first isocyanate content based on the weight of the liquid first polymer composition;
wherein the liquid second polymer composition in method step d) is characterized by a second isocyanate content based on the weight of the liquid second polymer composition;
wherein the first isocyanate content is more than the second isocyanate content.

3. The method according to claim 1, wherein the liquid first polymer composition in method step b) is characterized by
a. a molar OH content in mol per g of the liquid first polymer composition, and b. a molar isocyanate content in mol per g of the liquid first polymer composition, wherein the molar isocyanate content is more than the molar OH content.

4. The method according to claim 1, wherein the first di- or polyisocyanate comprises tolylene diisocyanate.

5. The method according to claim 1, wherein the further di- or polyisocyanate comprises hexamethylene diisocyanate.

6. The method according to claim 1, wherein the liquid first polymer composition in the overlaying in method step b) further comprises a colorant in a proportion in a range from 5% to 25% by weight, based on the weight of the liquid first polymer composition.

7. The method according to claim 1, wherein the sheetlike composite precursor in method step a) further comprises a barrier layer, wherein the barrier layer overlies the carrier layer on a side of the carrier layer remote from the outer face of the sheetlike composite precursor.

8. The method according to claim 1, wherein the method further comprises a method step of f) overlaying the carrier layer with a barrier layer on a side of the carrier layer remote from the outer face of the sheetlike composite precursor.

9. The method according to claim 1, wherein the sheetlike composite precursor in method step a) further comprises an outer polymer layer, wherein the outer polymer layer overlies the carrier layer on a side of the carrier layer facing the outer face of the sheetlike composite precursor.

10. The method according to claim 9, wherein the outer polymer layer comprises a polyethylene or a polypropylene or both.

11. The method according to claim 10, wherein the outer face is formed by the outer polymer layer;

wherein the overlaying in method step b) is effected by an application to the outer face; wherein, prior to method step b), a surface tension of the outer face is increased by means of a surface treatment to a value in a range from 38 to 44 dyne/cm.

* * * * *